US012811199B2

(12) United States Patent
Gaben

(10) Patent No.: US 12,811,199 B2
(45) Date of Patent: Nov. 24, 2026

(54) LITHIUM-ION BATTERY AND METHOD FOR THE MANUFACTURE THEREOF

(71) Applicant: I-TEN, Dardilly (FR)

(72) Inventor: Fabien Gaben, Dardilly (FR)

(73) Assignee: I-TEN, Dardilly (FR)

( * ) Notice: Subject to any disclaimer, the term of this patent is extended or adjusted under 35 U.S.C. 154(b) by 1014 days.

(21) Appl. No.: 17/907,437

(22) PCT Filed: Mar. 23, 2021

(86) PCT No.: PCT/IB2021/052375

§ 371 (c)(1),
(2) Date: Sep. 27, 2022

(87) PCT Pub. No.: WO2021/198843

PCT Pub. Date: Oct. 7, 2021

(65) Prior Publication Data

US 2023/0122314 A1 Apr. 20, 2023

(30) Foreign Application Priority Data

Mar. 30, 2020 (FR) .................................... 20166569

(51) Int. Cl.
*H01M 50/126* (2021.01)
*H01M 4/04* (2006.01)
(Continued)

(52) U.S. Cl.
CPC ..... *H01M 10/0585* (2013.01); *H01M 4/0404* (2013.01); *H01M 4/0407* (2013.01);
(Continued)

(58) Field of Classification Search
CPC ......... H01M 10/0585; H01M 10/0525; H01M 50/126; H01M 50/131; H01M 10/0413;
(Continued)

(56) References Cited

U.S. PATENT DOCUMENTS

2004/0253512 A1 12/2004 Watanabe et al.
2010/0035157 A1 2/2010 Nakamura
(Continued)

FOREIGN PATENT DOCUMENTS

JP 2007005279 A 1/2007
WO 2014007215 A1 1/2014
WO 2019002768 A1 1/2019

OTHER PUBLICATIONS

International Search Report for Application No. PCT/IB2021/052375, mailed Oct. 6, 2021, 4 pages.

*Primary Examiner* — James Lee
(74) *Attorney, Agent, or Firm* — Jordan IP Law, LLC; Todd A. Vaughn

(57) ABSTRACT

Battery including at least one unit cell formed by an anode, an electrolyte, and a cathode, defining a stack. The stack of the battery has a plurality of faces that includes two end faces opposite one another, two lateral faces opposite one another, and two longitudinal faces opposite one another. The first longitudinal face includes at least one anode connection zone and a second longitudinal face of the battery includes at least one cathode connection zone that is laterally opposite to the at least one anode connection zone. In a first longitudinal direction of the battery, each anode current-collecting substrate protrudes from each anode layer, from each layer of electrolyte material or layer of a separator impregnated with an electrolyte, from each cathode layer and from each cathode current-collecting substrate layer. In a second longitudinal direction of the battery that is opposite to the first longitudinal direction, each cathode current-collecting substrate protrudes from each anode layer, from each layer of electrolyte material, or layer of a separator impregnated with an electrolyte, from each cathode layer and from each anode current-collecting substrate layer.

12 Claims, 17 Drawing Sheets

(51) Int. Cl.
*H01M 10/0525* (2010.01)
*H01M 10/056* (2010.01)
*H01M 10/0585* (2010.01)
*H01M 50/131* (2021.01)

(52) U.S. Cl.
CPC ..... *H01M 10/0525* (2013.01); *H01M 10/056* (2013.01); *H01M 50/126* (2021.01); *H01M 50/131* (2021.01)

(58) Field of Classification Search
CPC ........... H01M 10/0436; H01M 10/052; H01M 10/056; H01M 4/64; H01M 50/124; H01M 50/461; H01M 50/54; H01M 50/543
See application file for complete search history.

(56) References Cited

U.S. PATENT DOCUMENTS

2018/0212210 A1 7/2018 Suzuki
2019/0288246 A1 9/2019 Kato et al.
2019/0393505 A1 12/2019 Suzuki et al.
2020/0152925 A1* 5/2020 Gaben ................. H01M 50/124

* cited by examiner

[Fig. 1]
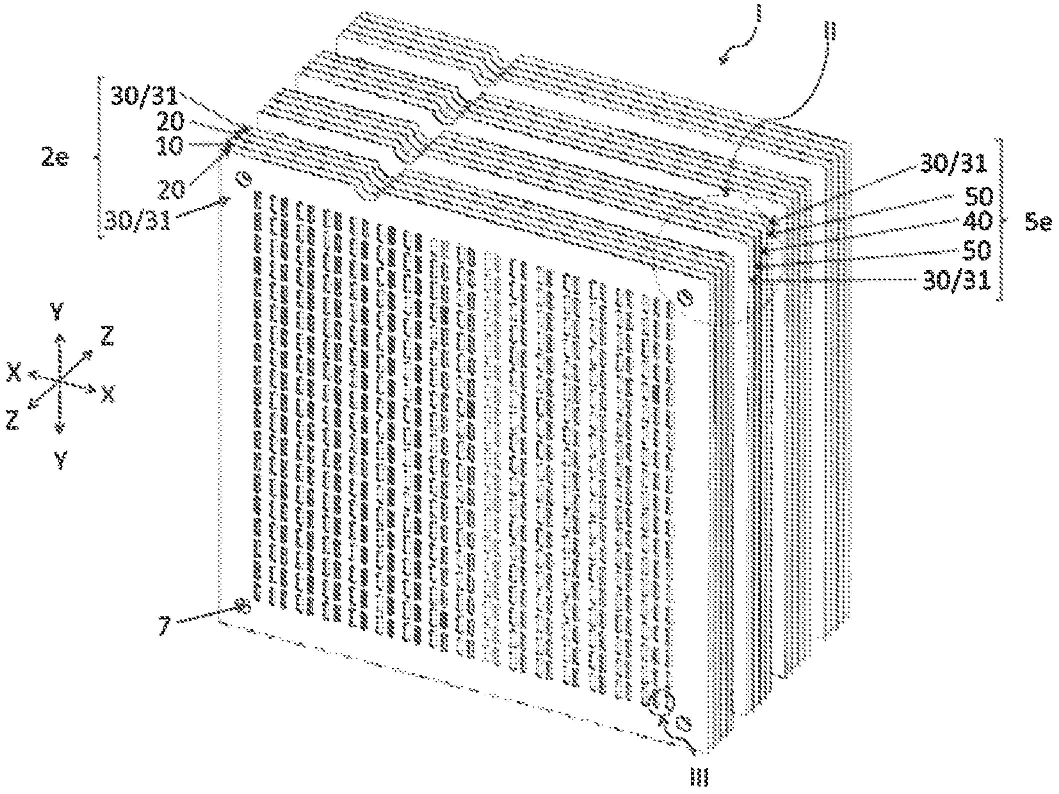

[Fig. 2]
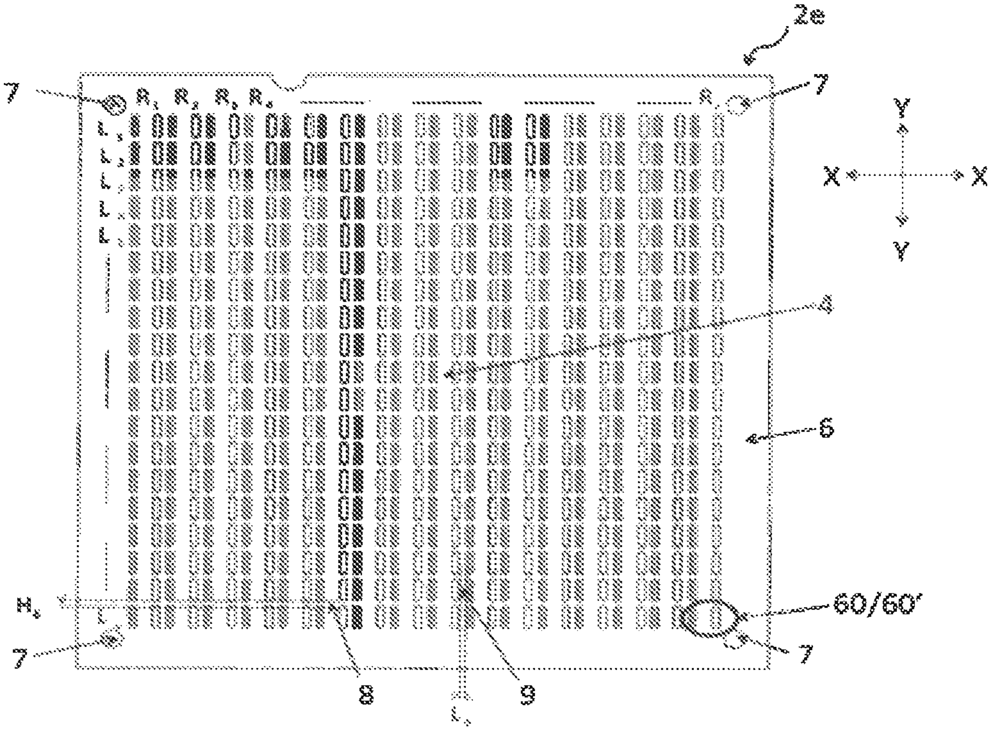

[Fig.3]
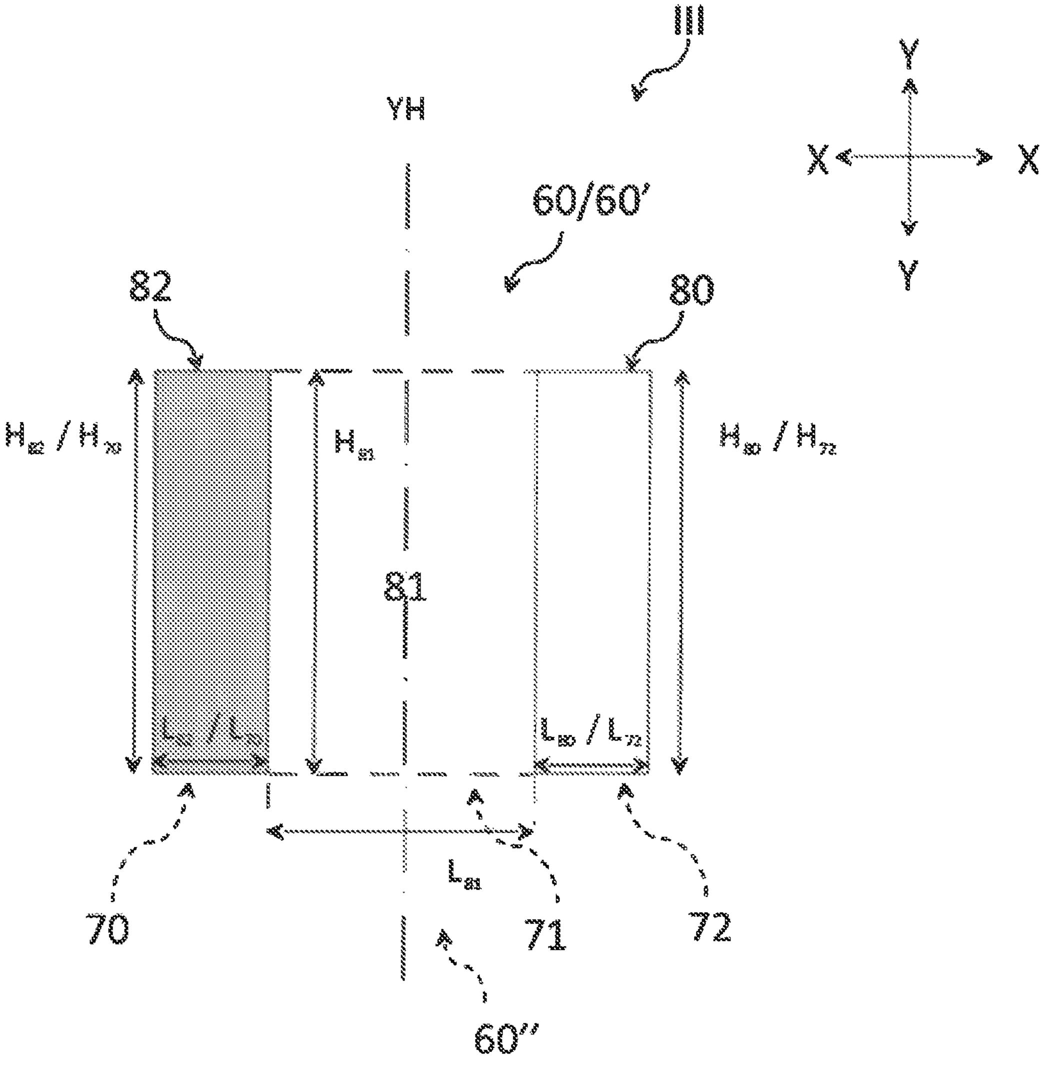

[Fig.4]
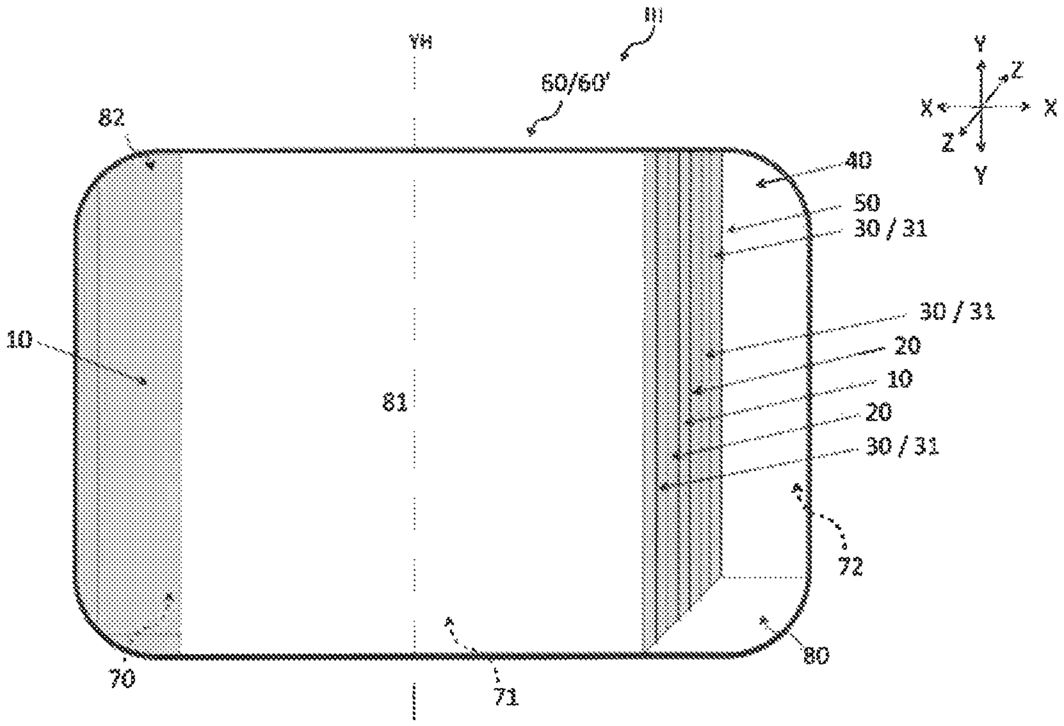

[Fig. 5]
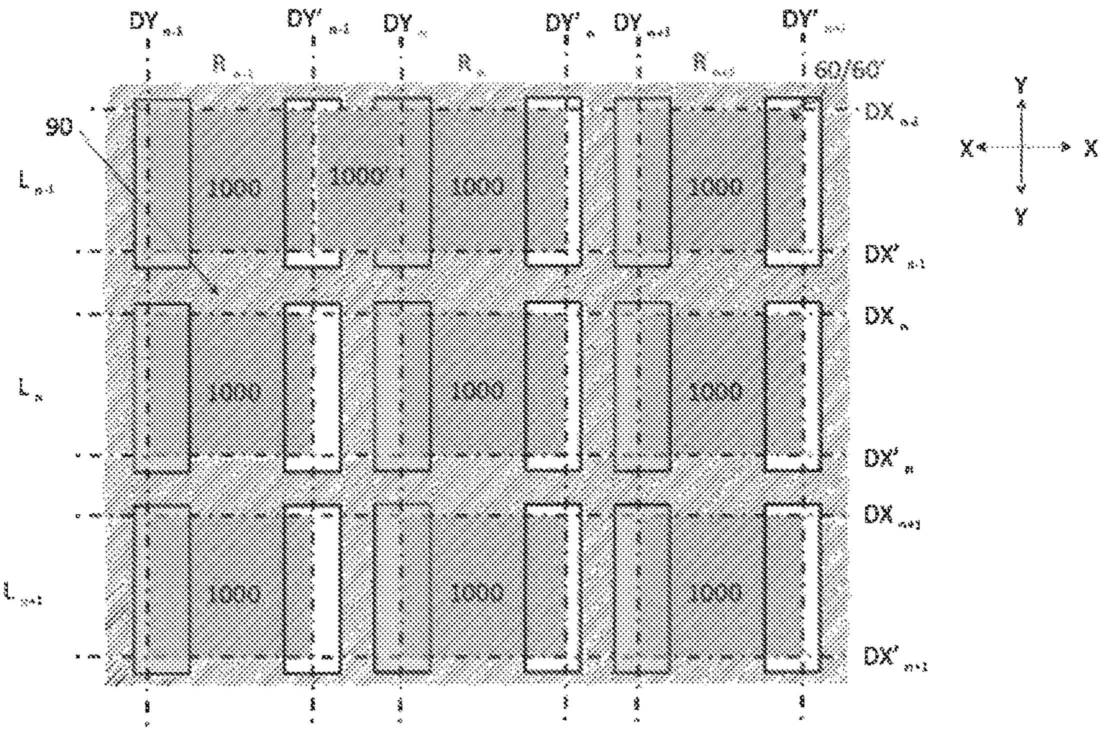

[Fig. 6]
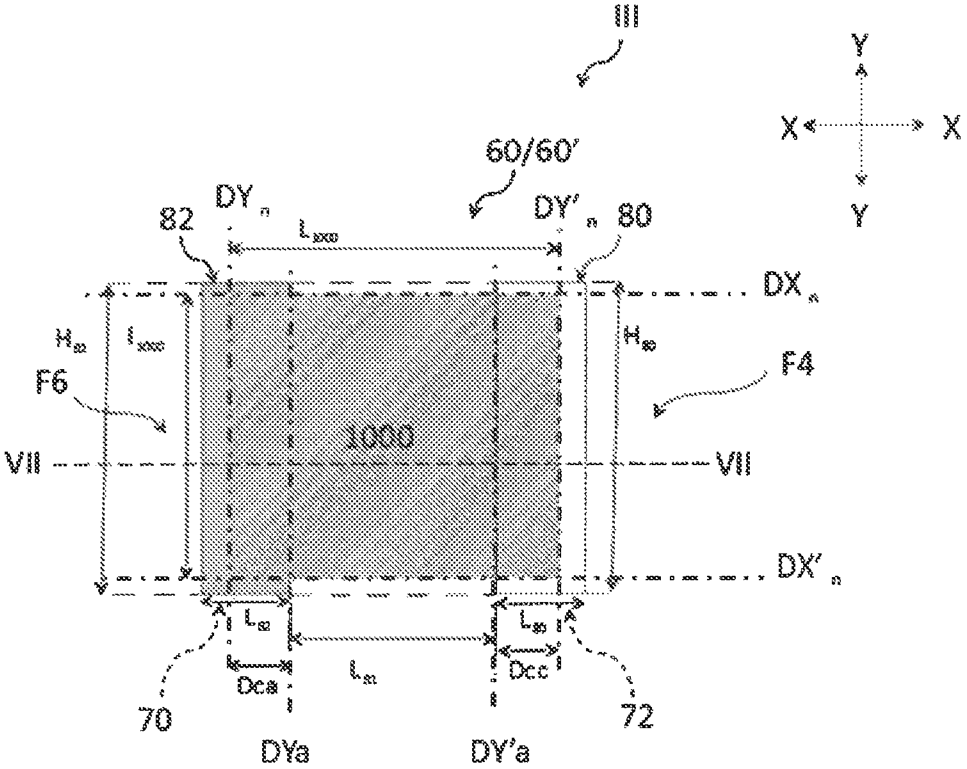

[Fig. 7]
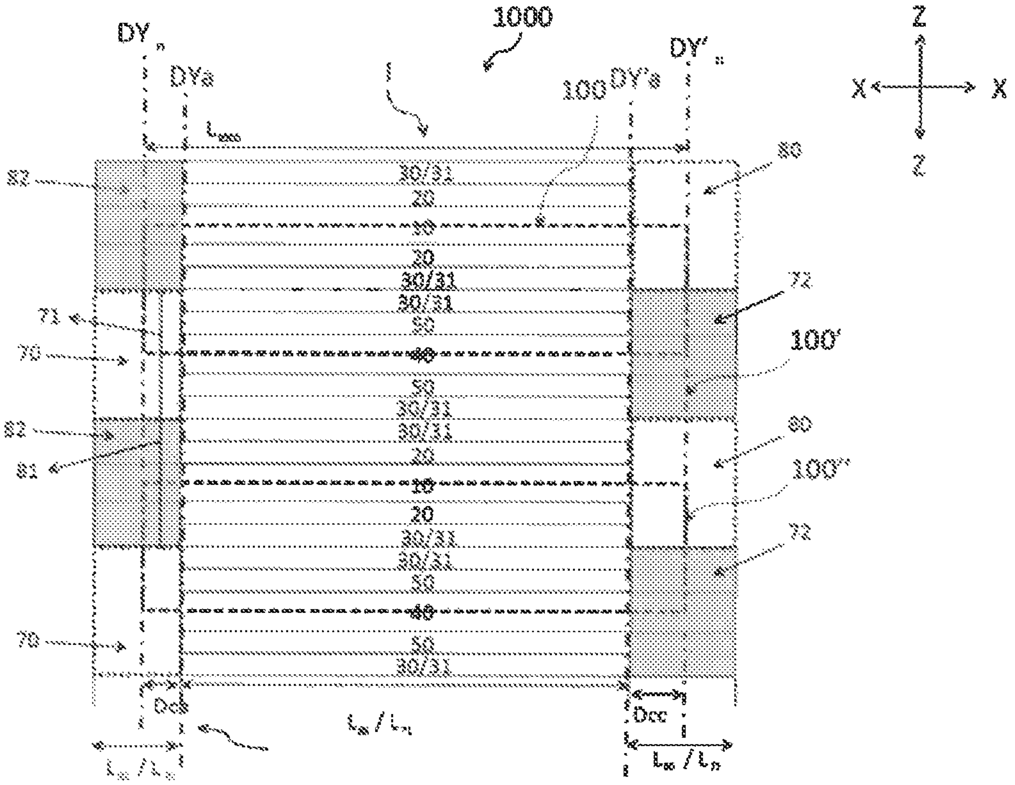

[Fig. 8]
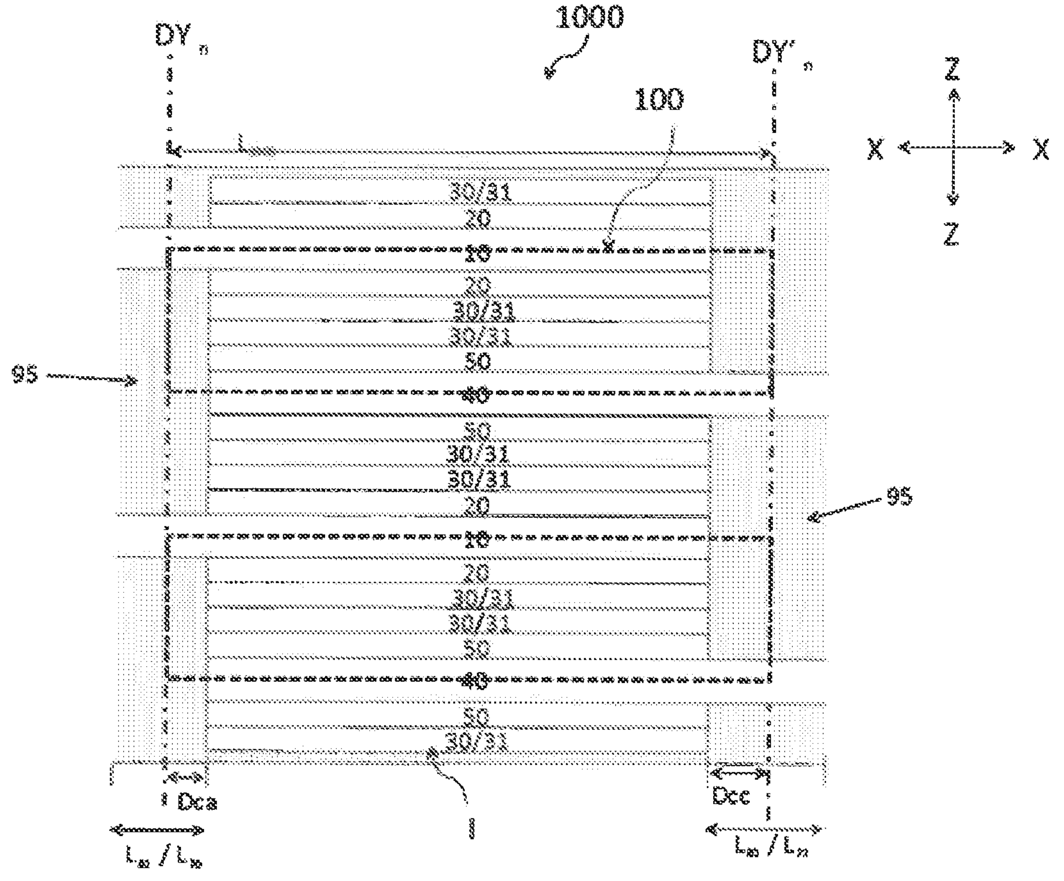

[Fig. 9]
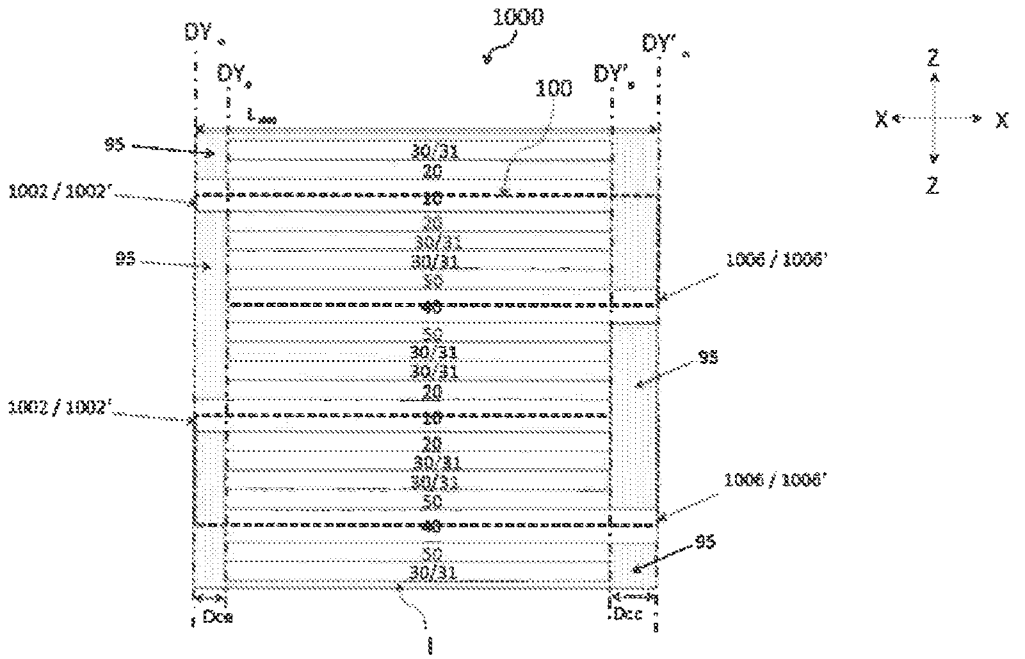

[Fig. 10]
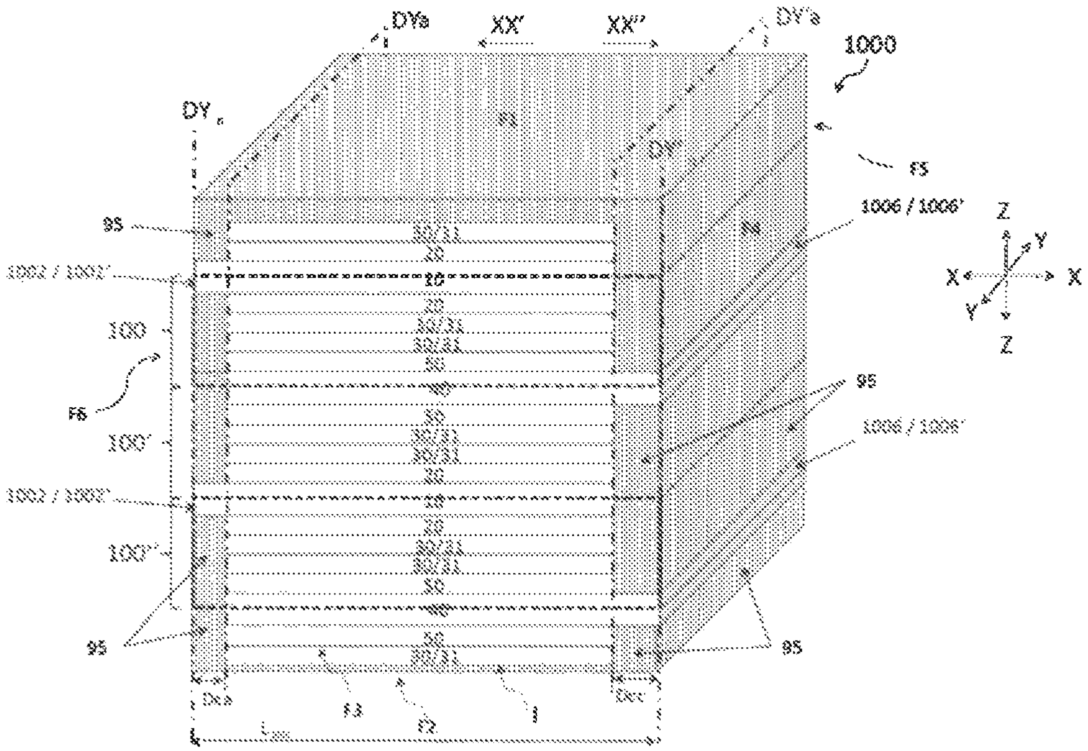

[Fig. 11]
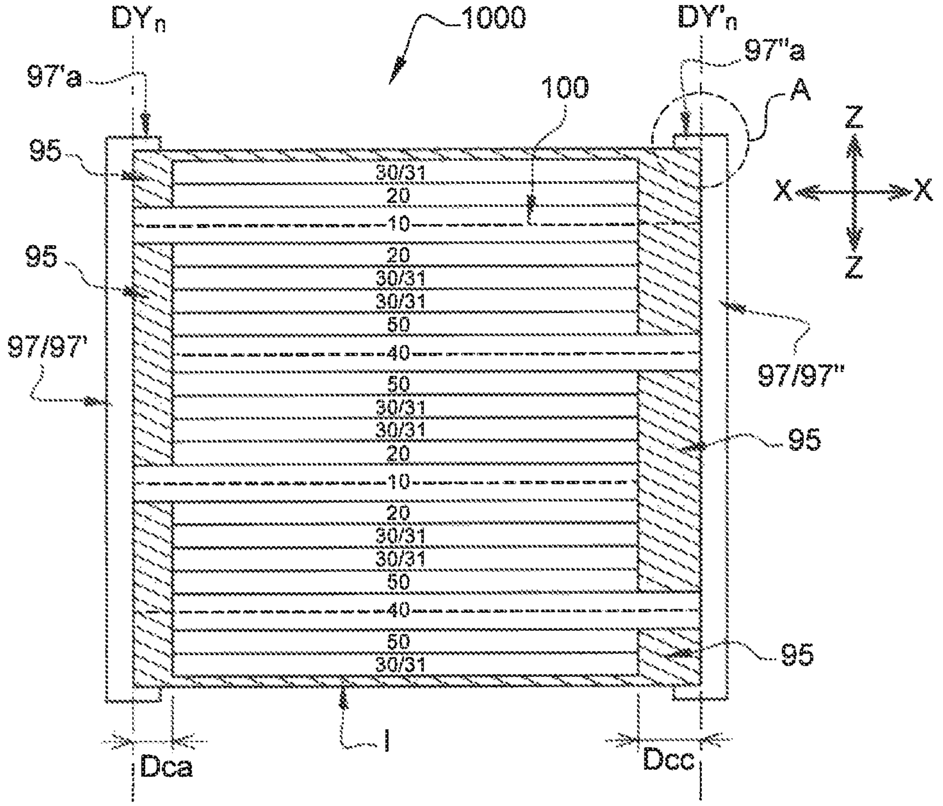
[Fig. 12]
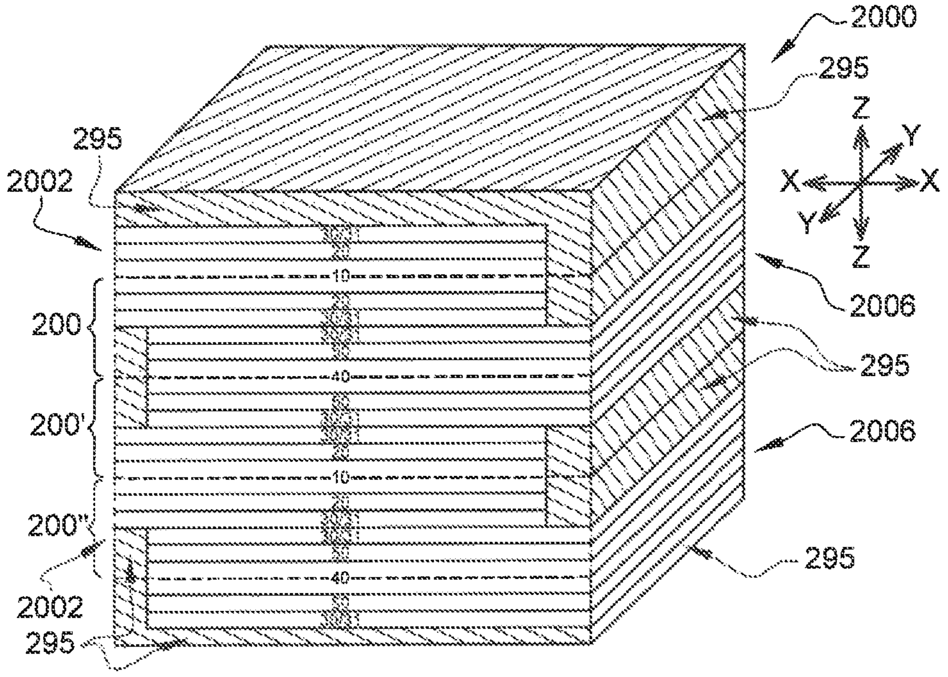

[Fig. 13]
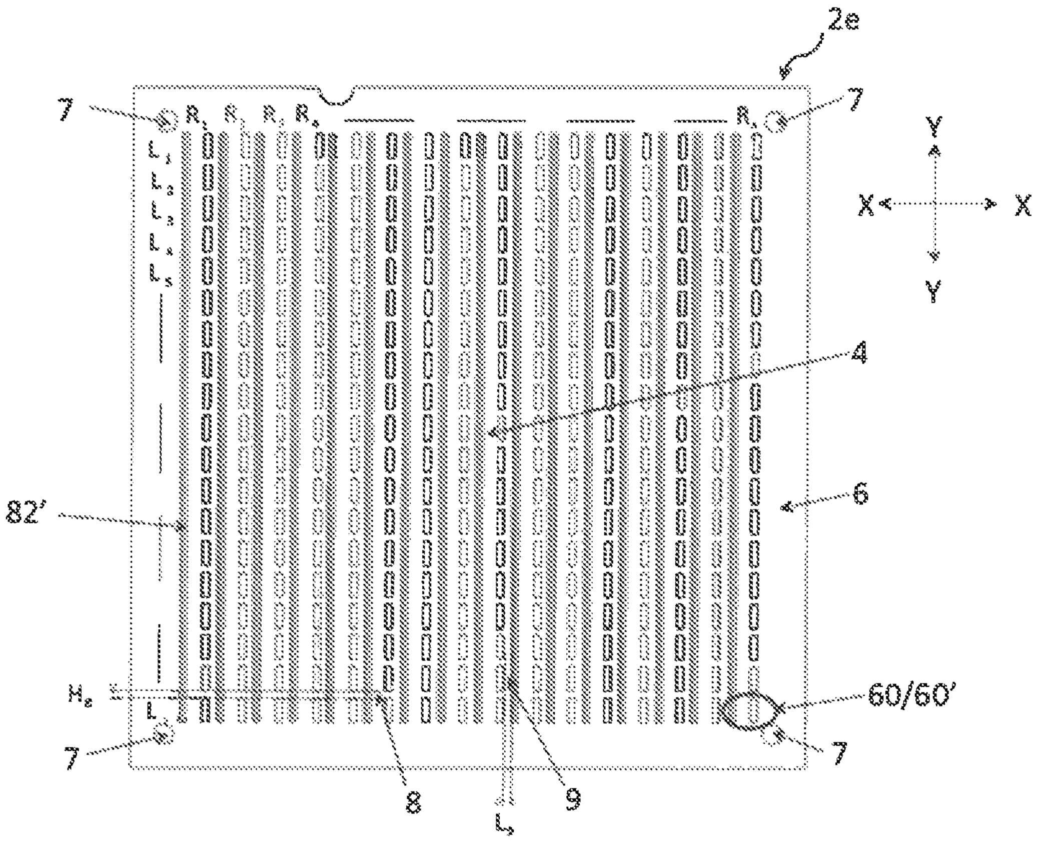

[Fig. 14]
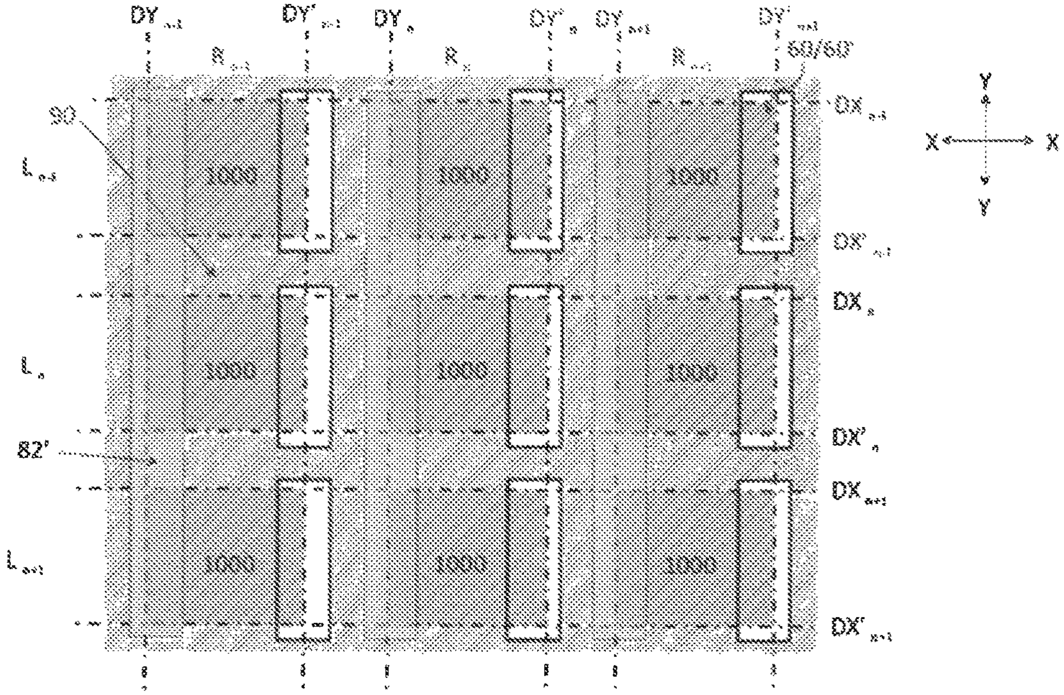
[Fig. 15]
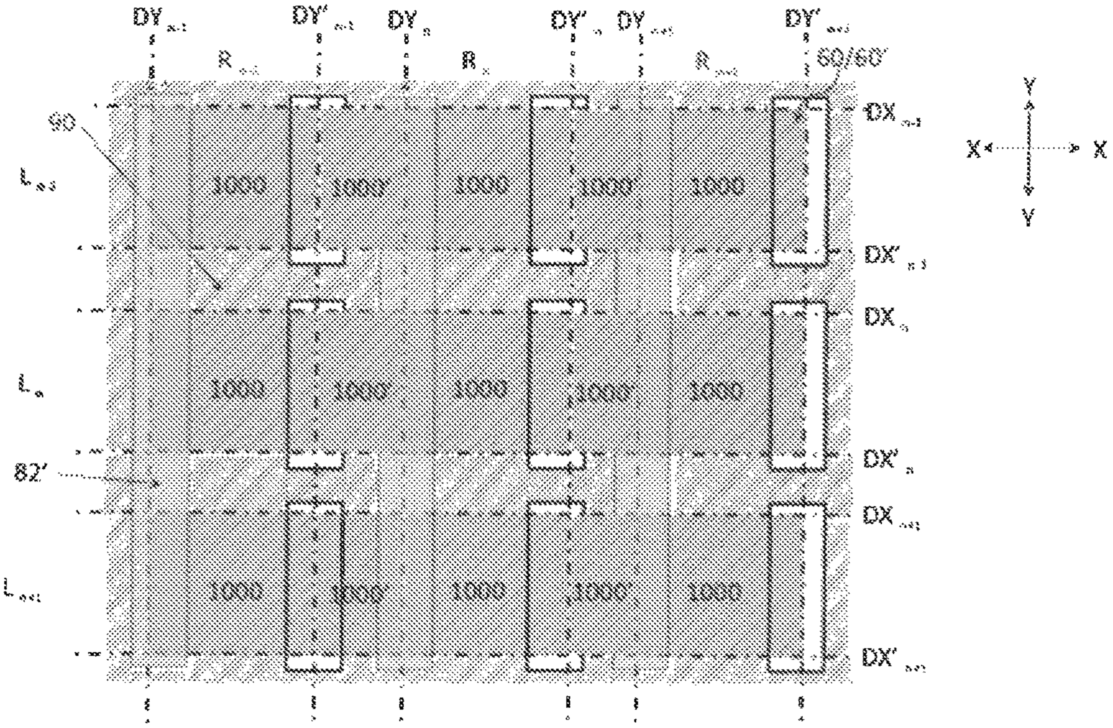

[Fig. 16]
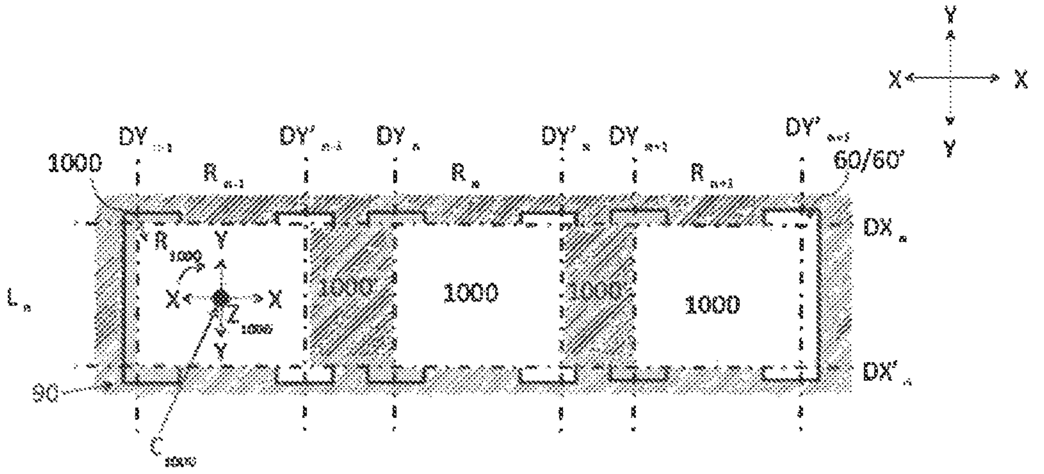
[Fig. 17]
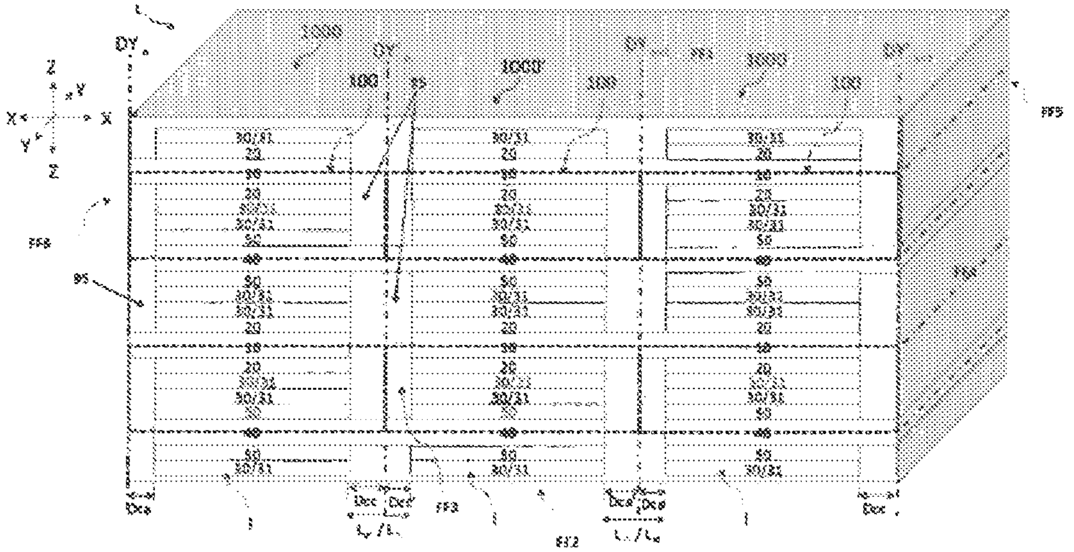

[Fig. 18]
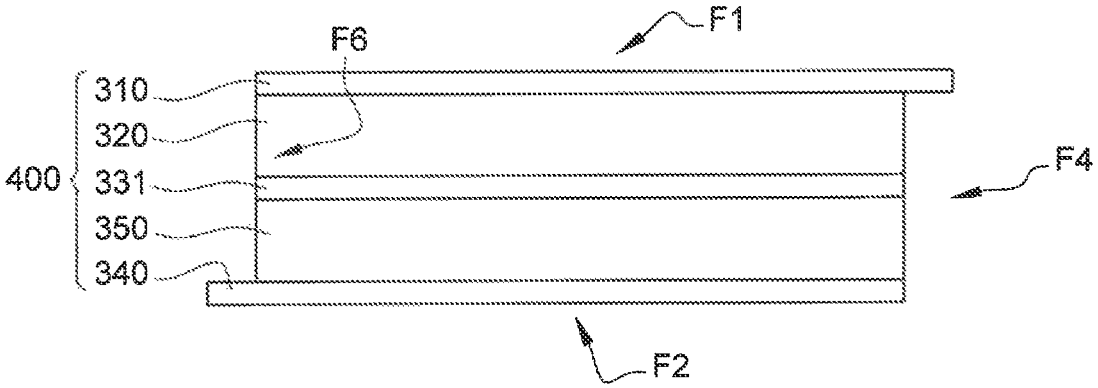
[Fig. 19]
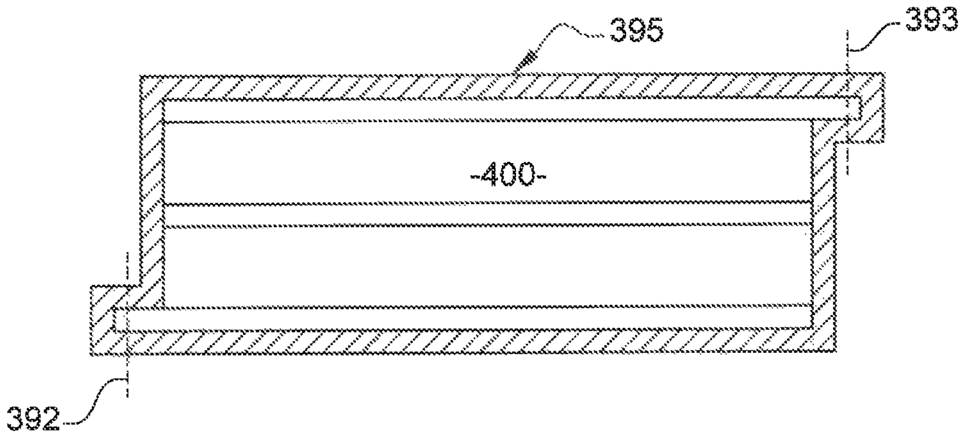
[Fig. 20]
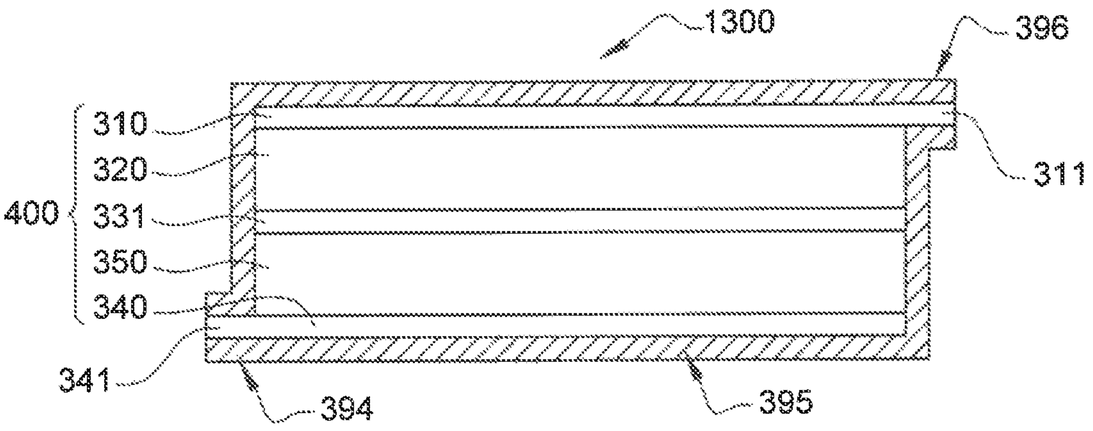

[Fig. 21]
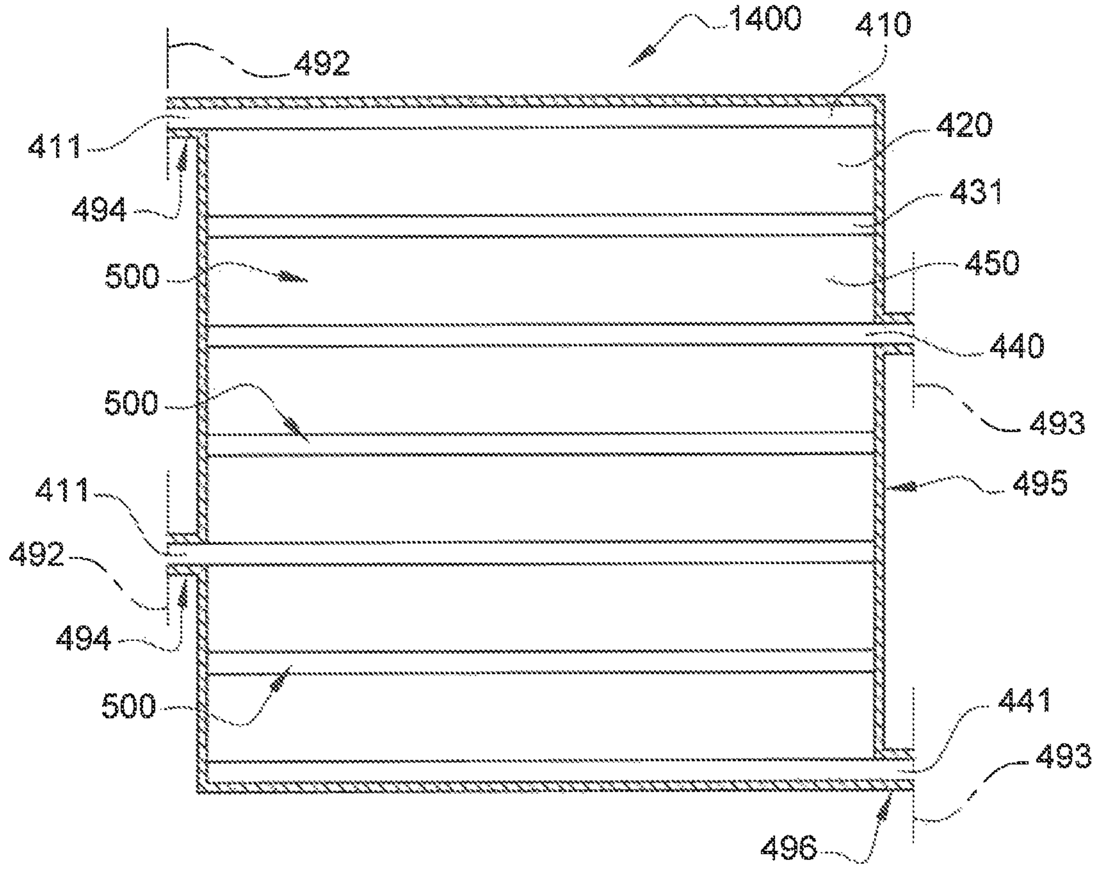
[Fig. 22]
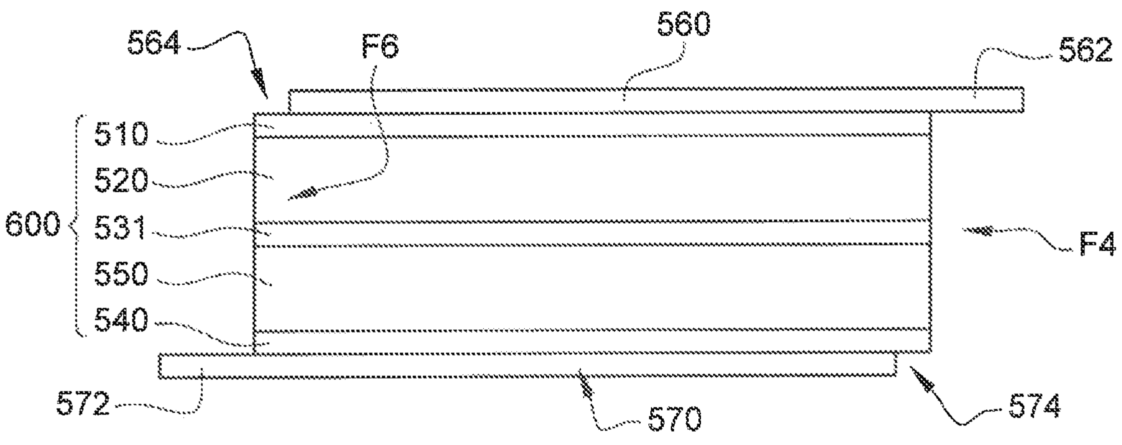

[Fig. 23]
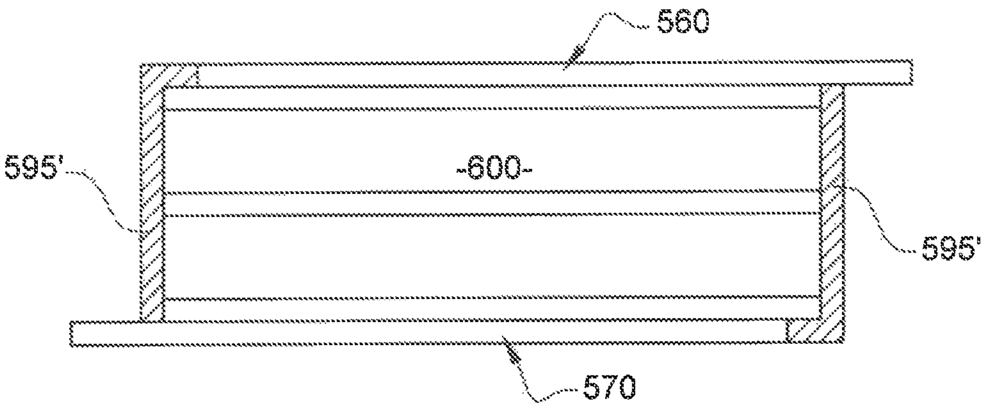
[Fig. 24]
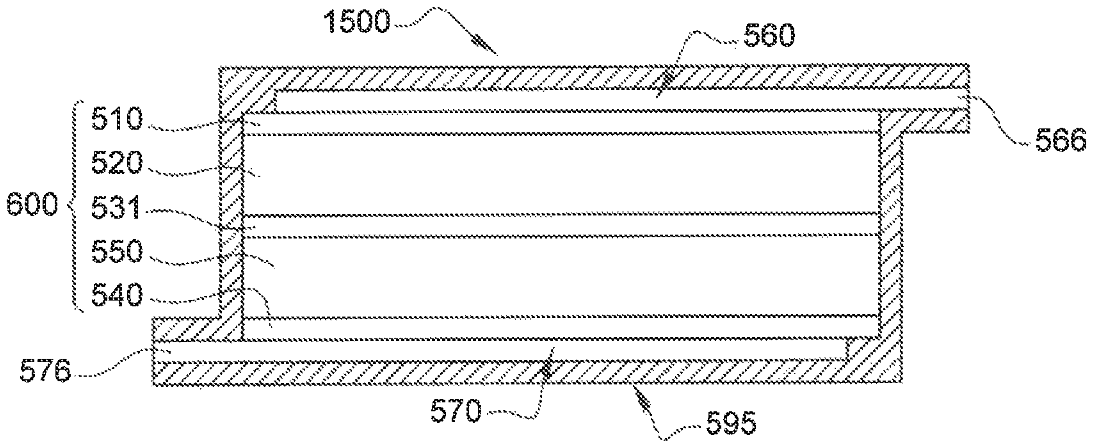
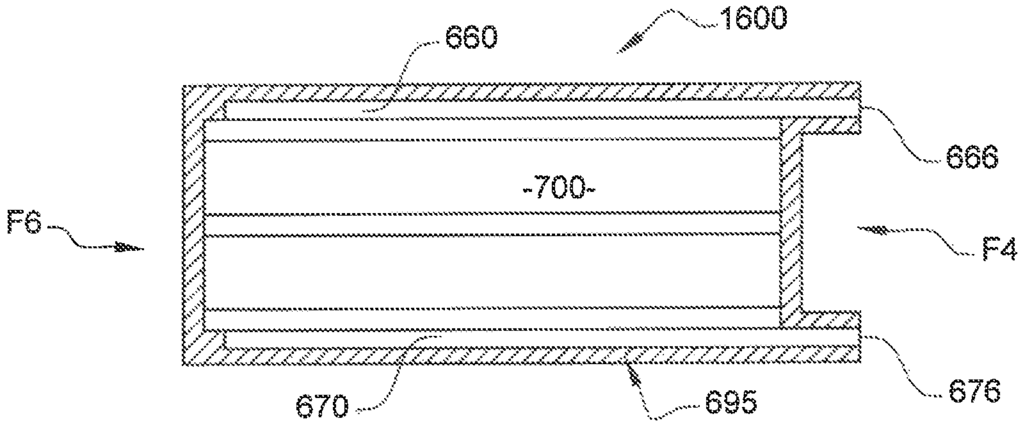
[Fig. 25]

LITHIUM-ION BATTERY AND METHOD FOR THE MANUFACTURE THEREOF

CROSS-REFERENCE TO RELATED APPLICATION

The present application is a National Stage Application of PCT International Application No. PCT/IB2021/052375 (filed on Mar. 23, 2021), under 35 U.S.C. § 371, which claims priority to European Patent Application No. EP 20166569.2 (filed on Mar. 30, 2020), which are each hereby incorporated by reference in their complete respective entireties.

TECHNICAL FIELD

The present invention relates to the field of batteries, and more particularly to lithium-ion batteries. The invention relates to lithium-ion batteries with a novel architecture giving them a longer life. The invention further relates to a novel method for manufacturing such batteries.

BACKGROUND

Rechargeable all-solid-state lithium-ion batteries are known. International Patent Publication No. WO 2016/001584 (I-TEN) describes a lithium-ion battery made from anode foils comprising a conductive substrate covered successively with an anode layer and an electrolyte layer, and cathode foils comprising a conductive substrate covered successively with a cathode layer and an electrolyte layer; these foils are cut, before or after deposition, into U-shaped patterns. These foils are then stacked alternately in order to form a stack of a plurality of unit cells. The anode and cathode foil cutting patterns are placed in a "head-to-tail" configuration such that the stacking of the cathodes and of the anodes is laterally offset. After the stacking step, a thick-layer encapsulation system about ten microns thick is deposited on the stack and in the available cavities present within the stack. This firstly ensures the stiffness of the structure at the cutting planes and secondly protects the battery cell from the atmosphere. Once the stack has been produced and is encapsulated, it is cut along cutting planes to obtain unit batteries, with the cathode connection zones and anode connection zones of the batteries being exposed on each of the cutting planes. When these cuts are made, the encapsulation system can be torn off, resulting in a break in the battery's impervious seal. Terminations (i.e. electrical contacts) are also known to be added where these cathode and anode connection zones are apparent.

It has become apparent that this known solution can have certain drawbacks. More specifically, depending on the positioning of the electrodes, in particular the proximity of the edges of the electrodes for multi-layer batteries and the cleanness of the cuts, a leakage current can appear at the ends, typically in the form of a creeping short-circuit. This creeping short-circuit reduces battery performance, despite the use of an encapsulation system around the battery and near the cathode and anode connection zones. Moreover, an unsatisfactory deposition of the encapsulation system on the battery is occasionally observed, in particular on the edges of the battery at the spaces created by the lateral offsetting of the electrodes on the edges of the battery.

U.S. Patent Publication No. 2018/0212210 filed by Suzuki also discloses a battery firstly comprising a plurality of unit cells. The resulting stack is placed in a metal casing with the interposition of a resin. This secures the cells mechanically, so that they do not move during operation. This resin also prevents the risk of short-circuits, which would result from the cells coming into contact with the metal casing, in particular during potential impacts or vibrations.

Finally, Japanese Patent Publication No. JP 2007/005279 filed by Matsushita is cited. This document discloses an all-solid-state battery obtained by sintering. This battery thus comprises neither an electrolyte material nor a layer of a separator impregnated with such an electrolyte.

SUMMARY

The present invention aims to overcome, at least in part, some of the aforementioned drawbacks of the prior art, and in particular to obtain rechargeable lithium-ion batteries with a high energy density and a high power density.

It in particular aims to increase the production output for rechargeable lithium-ion batteries with a high energy density and a high power density and to produce more efficient encapsulations at a lower cost.

It in particular aims to propose a method that reduces the risk of a creeping or accidental short-circuit, and that allows a battery with a low self-discharge rate to be manufactured.

It in particular aims to propose a method that allows a battery with a very long life to be manufactured in a simple, reliable and fast manner.

It further aims to propose a simple, fast and cost-effective method for manufacturing batteries.

The invention firstly relates to a battery comprising at least one unit cell, each unit cell successively comprising an anode current-collecting substrate, an anode layer, at least one layer of an electrolyte material and/or at least one layer of a separator impregnated with an electrolyte, a cathode layer, and a cathode current-collecting substrate, wherein, in the case where said battery comprises a plurality of unit cells, said unit cells are disposed one below the other, i.e. superimposed according to a frontal orientation relative to the main plane of the battery, such that, preferably:

the anode current-collecting substrate is the anode current-collecting substrate of two adjacent unit cells, and wherein the cathode current-collecting substrate is the cathode current-collecting substrate of two adjacent unit cells, said at least one unit cell or said unit cells define a stack, said stack and said battery having six faces. The six faces include:

two so-called end faces opposite one another, in particular parallel to one another, generally parallel to the one or more anode current-collecting substrates, to the one or more anode layers, to the one or more layers of an electrolyte material or to the one or more layers of a separator impregnated with an electrolyte, to the one or more cathode layers, and to the one or more cathode current-collecting substrates, two so-called lateral faces opposite one another, in particular parallel to one another, and two so-called longitudinal faces opposite one another, in particular parallel to one another, wherein the first longitudinal face of the battery comprises at least one anode connection zone and that a second longitudinal face of the battery comprises at least one cathode connection zone, said anode and cathode connection zones being laterally opposite one another, wherein in a first longitudinal direction of the battery, each anode current-collecting substrate protrudes from each anode layer, from each layer of electrolyte material or layer of a separator impregnated with an electrolyte, from each cathode layer and from each cathode current-collecting substrate layer, and wherein in a second longitudinal direction of the battery that is opposite to said first longitudinal direction, each cathode current-collecting substrate protrudes from each anode layer, from each layer of electrolyte material or layer of a separator impregnated with an electrolyte, from each cathode layer and from each anode current-collecting substrate layer.

In one specific embodiment:

each anode current-collecting substrate protrudes from a first end plane, this first plane being defined by the first longitudinal ends of each anode layer, of each layer of electrolyte material or separator layer, of each cathode layer and of each cathode current-collecting substrate layer, and/or each cathode current-collecting substrate protrudes from a second end plane, this second plane being defined by the second longitudinal ends of each anode layer, of each layer of electrolyte material or separator layer, of each cathode layer and of each anode current-collecting substrate layer.

According to a particularly advantageous embodiment of the invention, the battery according to the invention comprises an encapsulation system covering at least part of the outer periphery of the stack, said encapsulation system including at least one impervious cover layer, having a water vapour permeance (WVTR) of less than $10^{-5}$ g/m$^2$·d, this encapsulation system being in direct contact at least with said layer of electrolyte material and/or with said layer of a separator impregnated with an electrolyte, at each longitudinal face. Preferably, the encapsulation system is also in direct contact, at each longitudinal face, with the anode layer, the cathode layer and the non-protruding current-collecting substrate.

Advantageously, the encapsulation system is electrically insulating, the conductivity of this encapsulation system advantageously being less than $10^{e-11}$ S·m$^{-1}$, in particular less than $10^{e-12}$ S·m$^{-1}$.

Advantageously, the encapsulation system covers at least part of the outer periphery of the stack, said encapsulation system covering the end faces of the stack, the lateral faces and at least part of the longitudinal faces, such that:

only each anode edge of each anode current-collecting substrate protruding from each anode layer, from each layer of electrolyte material or separator layer, from each cathode layer and from each cathode current-collecting substrate layer in the first longitudinal direction of the battery, lies flush with a first longitudinal face, and only each cathode edge of each cathode current-collecting substrate protruding from each anode layer, from each layer of electrolyte material or separator layer, from each cathode layer and from each anode current-collecting substrate layer in the second longitudinal direction of the battery, lies flush with a second longitudinal face, said second longitudinal face being preferably opposite and parallel to the first longitudinal face, wherein each anode edge defines an anode connection zone and each cathode edge defines a cathode connection zone.

According to yet another aspect of the invention, the encapsulation system comprises:

optionally, a first cover layer, preferably chosen from among parylene, parylene F, polyimide, epoxy resins, silicone, polyamide, sol-gel silica, organic silica and/or a mixture thereof, deposited on at least part of the outer periphery of the stack, optionally, a second cover layer consisting of an electrically insulating material, deposited by atomic layer deposition on at least part of the outer periphery of the stack, or on the first cover layer, at least a third impervious cover layer, preferably having a water vapour permeance (WVTR) of less than 10-5 g/m2·d, this third cover layer being made of a ceramic material and/or a low melting point glass, preferably a glass with a melting point below 600° C., deposited on at least part of the outer periphery of the stack, or on the first cover layer, wherein when said second cover layer is present: a succession of said second cover layer and of said third cover layer can be repeated z times, where z≥1, and deposited on the outer periphery of at least the third cover layer, and the last layer of the encapsulation system being an impervious cover layer, preferably having a water vapour permeance (WVTR) of less than 10-5 g/m2·d, and being made of a ceramic material and/or a low melting point glass.

According to yet another aspect of the invention, at least the anode connection zone, preferably the first longitudinal face comprising at least the anode connection zone, is covered by an anode contact member, and at least the cathode connection zone, preferably the second longitudinal face comprising at least the cathode connection zone, is covered by a cathode contact member, wherein said anode and cathode contact members are capable of producing the electrical contact between the stack and an external conductive element.

According to yet another aspect of the invention, each of the anode and cathode contact members comprises:

a first electrical connection layer, disposed on at least the anode connection zone and at least the cathode connection zone, preferably on the first longitudinal face comprising at least the anode connection zone and on the second longitudinal face comprising at least the cathode connection zone, the first electrical connection layer comprising a material filled with electrically conductive particles, preferably a polymeric resin and/or a material obtained by a sol-gel method, filled with electrically conductive particles and more preferably a graphite-filled polymeric resin, and a second electrical connection layer comprising a metal foil disposed on the first layer of material filled with electrically conductive particles.

According to yet another aspect of the invention, the smallest distance between the first longitudinal face comprising at least one anode connection zone and the first end plane defined by the first longitudinal ends of each anode layer, of each layer of electrolyte material and/or separator layer, of each cathode layer and of each cathode current-collecting substrate layer is comprised between 0.01 mm and 0.5 mm, and/or the smallest distance between the second longitudinal face comprising at least one cathode connection zone and the second end plane defined by the second longitudinal ends of each anode layer, of each layer of electrolyte material and/or separator layer, of each cathode layer and of each anode current-collecting substrate layer, is comprised between 0.01 mm and 0.5 mm.

The invention further relates to a method for manufacturing at least one battery, each battery comprising at least one unit cell, each unit cell successively comprises an anode current-collecting substrate, an anode layer, at least one layer of an electrolyte material and/or at least one layer of a separator impregnated with an electrolyte, a cathode layer, and a cathode current-collecting substrate, wherein, in the case where said battery comprises a plurality of unit cells, said unit cells are disposed one below the other, i.e. superimposed according to a frontal orientation relative to the main plane of the battery, wherein:

the anode current-collecting substrate is the anode current-collecting substrate of two adjacent unit cells, and the cathode current-collecting substrate is the cathode current-collecting substrate of two adjacent unit cells, said at least one unit cell or said unit cells define a stack, said stack and said battery having six faces. The six faces including:

two so-called end faces opposite one another, in particular parallel to one another, generally parallel to the one or more anode current-collecting substrates, to the one or more anode layers, to the one or more layers of an electrolyte material or to the one or more layers of a separator impregnated with an electrolyte, to the one or more cathode layers, and to the one or more cathode current-collecting substrates, two so-called lateral faces opposite one another, in particular parallel to one another, and two so-called longitudinal faces opposite one another, in particular parallel to one another, wherein the first longitudinal face of the battery comprises at least one anode connection zone and that a second longitudinal face of the battery comprises at least one cathode connection zone, said anode and cathode connection zones being laterally opposite one another, such that:

in a first longitudinal direction of the battery, each anode current-collecting substrate protrudes from each anode layer, from each layer of electrolyte material or layer of a separator impregnated with an electrolyte, from each cathode layer and from each cathode current-collecting substrate layer, and in a second longitudinal direction of the battery that is opposite to said first longitudinal direction, each cathode current-collecting substrate protrudes from each anode layer, from each layer of electrolyte material or layer of a separator impregnated with an electrolyte, from each cathode layer and from each anode current-collecting substrate layer.

The manufacturing method comprises:

a first step of supplying at least one anode current-collecting substrate foil having grooves, uncoated zones and zones coated with an anode layer, optionally coated with a layer of an electrolyte material or with a separator layer, hereinafter referred to as an anode foil, a second step of supplying at least one cathode current-collecting substrate foil having grooves, uncoated zones and zones coated with a cathode layer, optionally coated with a layer of an electrolyte material or with a separator layer, hereinafter referred to as a cathode foil, a third step of producing a stack alternating at least one anode foil having grooves, uncoated zones and coated zones with at least one cathode foil having grooves, uncoated zones and coated zones, so as to obtain at least one unit cell successively comprising an anode current-collecting substrate, an anode layer, at least one layer of an electrolyte material or of a separator, a cathode layer, and a cathode current-collecting substrate, and wherein: in the first longitudinal direction of the battery, each anode current-collecting substrate protrudes from each anode layer, from each layer of electrolyte material and/or separator layer, from each cathode layer and from each cathode current-collecting substrate layer, and in the second longitudinal direction of the battery that is opposite to said first longitudinal direction, each cathode current-collecting substrate protrudes from each anode layer, from each layer of electrolyte material and/or separator layer, from each cathode layer and from each anode current-collecting substrate layer, a fourth step of heat treating and/or mechanically compressing the stack of alternating foils obtained in the third step, so as to form a consolidated stack, optionally, a fifth step of making a first pair of cuts allowing a given battery line to be separated from at least one other battery line formed from said consolidated stack, optionally a sixth step of impregnating the consolidated stack obtained in the fourth step or of impregnating the battery line obtained in the fifth step when this fifth step is carried out, with a phase carrying lithium ions such as liquid electrolytes or an ionic liquid containing lithium salts, such that said separator layer is impregnated by an electrolyte, optionally a seventh step of making a second pair of cuts to expose (i) the anode edge of each anode current-collecting substrate protruding from each anode layer, from each layer of electrolyte material or separator layer, from each cathode layer and from each cathode current-collecting substrate layer in the first longitudinal direction of the battery, each anode edge defining at least one anode connection zone, and (ii) the cathode edge of each cathode current-collecting substrate protruding from each anode layer, from each layer of electrolyte material or separator layer, from each cathode layer and from each anode current-collecting substrate layer in the second longitudinal direction of the battery, each cathode edge defining at least one cathode connection zone, said second pair of cuts enabling, when said fifth step is carried out, a given battery to be separated from at least one other battery formed from the battery line.

In one specific embodiment of the method, after the sixth step (if carried out), or if the sixth step is not carried out, after the fifth step (if carried out), or if the sixth step and the fifth step are not carried out, after the fourth step, and before the seventh step, an eighth step of encapsulating the consolidated stack or battery line is carried out, preferably in which, at least part of the outer periphery of the stack or of the battery line, preferably the end faces of the stack or of the battery line, the lateral faces and at least part of the longitudinal faces, are covered by an encapsulation system such that:

only each anode edge of each anode current-collecting substrate protruding from each anode layer, from each layer of electrolyte material or separator layer, from each cathode layer and from each cathode current-collecting substrate layer in the first longitudinal direction of the battery, lies flush with a first longitudinal face, and only each cathode edge of each cathode current-collecting substrate protruding from each anode layer, from each layer of electrolyte material or separator layer, from each cathode layer and from each anode current-collecting substrate layer in the second longitudinal direction of the battery, lies flush with a second longitudinal face, said second longitudinal face being preferably opposite and parallel to the first longitudinal face, wherein each anode edge defines an anode connection zone and that each cathode edge defines a cathode connection zone.

The encapsulation system preferably comprises:

optionally, at least one first cover layer, preferably chosen from among parylene, parylene F, polyimide, epoxy resins, silicone, polyamide, sol-gel silica, organic silica and/or a mixture thereof, deposited on at least part of the outer periphery of the stack or of the battery line, optionally, a second cover layer consisting of an electrically insulating material, deposited by atomic layer deposition, on at least part of the outer periphery of the stack or of the battery line, or on the first cover layer, and at least one third impervious cover layer, preferably having a water vapour permeance (WVTR) of less than $10^{-5}$ g/m$^2$·d, this third cover layer being made of a ceramic material and/or a low melting point glass, preferably a glass with a melting point below 600° C., deposited on at least part of the outer periphery of the stack or of the battery line, or on the first cover layer, wherein a sequence of at least one second cover layer and at least one third cover layer can be repeated z times, where z≥1, and deposited at the outer periphery of at least the third cover layer, and that the last layer of the encapsulation system is an impervious cover layer, preferably having a water vapour permeance (WVTR) of less than $10^{-5}$ g/m$^2$·d, and being made of a ceramic material and/or a low melting point glass.

In another specific embodiment of the method according to the invention, which can be combined with the above, after the seventh step, at least the anode connection zone, preferably at least the first longitudinal face comprising at least the anode connection zone, is covered by an anode contact member, capable of producing the electrical contact between the stack and an external conductive element, and at least the cathode connection zone, preferably at least the second longitudinal face comprising at least the cathode connection zone, is covered by a cathode contact member, capable of producing the electrical contact between the stack and an external conductive element, said production of anode and cathode contact members comprising:

depositing, on at least the anode connection zone and on at least the cathode connection zone, preferably on at least the first longitudinal face comprising at least the anode connection zone and on at least the second longitudinal face comprising at least the cathode connection zone, a first electrical connection layer made of a material filled with electrically conductive particles, said first layer preferably being made of polymeric resin and/or a material obtained by a sol-gel method filled with electrically conductive particles, optionally, when said first layer is made of polymeric resin and/or a material obtained by a sol-gel method filled with electrically conductive particles, a drying step followed by a step of polymerising said polymeric resin and/or said material obtained by a sol-gel method, depositing, on the first layer, a second electrical connection layer comprising a metal foil disposed on the first electrical connection layer, and optionally, depositing on the second electrical connection layer a third electrical connection layer comprising a conductive ink.

DRAWINGS

The accompanying figures, given as non-limiting examples, show different aspects and embodiments of the invention.

FIG. 1 is a perspective view of the anode and cathode foils intended to form a stack according to the method for manufacturing batteries according to the invention, these anode and cathode foils with unit entities comprising uncoated zones, coated zones, and grooves.

FIG. 2 is a front view showing one of the foils, in particular an anode foil in FIG. 1.

FIG. 3 is a front view showing, on a larger scale, a unit entity consisting of an uncoated zone hereinafter referred to using the term "exclusion area", a coated zone, and a groove, made in an anode foil according to the invention or according to an alternative embodiment of the invention.

FIG. 4 is a perspective view, also on a large scale, showing the uncoated zones or exclusion areas, the coated zones and the grooves of these unit entities provided in adjacent foils.

FIG. 5 is an overhead view showing a cutting step carried out on different unit entities provided in the stack in the preceding figures.

FIG. 6 is an overhead view showing, on a larger scale, the cuts made in the unit entities.

FIG. 7 is a sectional view, along the cutting line VII-VII shown in FIG. 6, showing the stack of the anode and cathode unit entities according to the invention or according to an alternative embodiment of the invention, each of these unit entities consisting of an uncoated zone, a coated zone and a groove.

FIG. 8 is a sectional view, along the cutting line VII-VII shown in FIG. 6, showing the stack of the unit entities encapsulated in an encapsulation system.

FIG. 9 is a sectional view, along the cutting line VII-VII, showing a battery according to the invention comprising an encapsulation system, which can be obtained in particular according to the method shown in the preceding figures.

FIG. 10 is a perspective view showing a battery according to the invention, comprising an encapsulation system, which can be obtained in particular according to the method shown in the preceding figures.

FIG. 11 is a sectional view, along the cutting line VII-VII showing a battery according to the invention comprising an encapsulation system and contact member, which can be obtained in particular according to the method shown in the preceding figures.

FIG. 12 is a perspective view showing a battery according to the prior art.

FIG. 13 is a front view, showing one of the foils according to an alternative embodiment of the invention, in particular an anode foil where the anode exclusion areas are made in the form of a single exclusion strip.

FIG. 14 is an overhead view showing a cutting step carried out on different unit entities provided in the stack according to an alternative embodiment of the invention.

FIG. 15 is an overhead view showing a cutting step carried out on different unit entities provided in the stack according to an alternative embodiment of the invention and showing the batteries obtained according to this alternative embodiment.

FIG. 16 is an overhead view showing a battery line according to the invention.

FIG. 17 is a perspective view showing a battery line according to the invention, comprising an encapsulation system, which can be obtained in particular according to the method shown in the preceding figures.

FIG. 18 through [FIG. 20] are front views showing successive steps for producing a battery according to another embodiment of the invention, wherein this battery includes a single cell and each current collector forms a tab.

FIG. 21 is a front view similar to that in FIG. 8, showing a battery according to an alternative embodiment to that in FIG. 8.

FIG. 22 to [FIG. 24] are front views, similar to those in FIGS. 18 to 21, showing successive steps for producing a battery according to yet another embodiment of the invention, using a metal grid-type electrical connection support.

FIG. 25 is a front view similar to that in FIG. 24, showing an alternative embodiment to that in FIG. 24.

DESCRIPTION

As a rule, the following geometric designations are associated with this battery:

- ZZ refers to the so-called frontal orientation, i.e. perpendicular to the plane of the different stacked layers;
- XX refers to the so-called longitudinal orientation, which is included in the plane of the stacked layers and which is parallel to the largest dimension of these layers, when viewed from above, i.e. in the frontal orientation;
- YY refers to the so-called lateral or transverse orientation, which is included in the plane of the stacked layers and which is parallel to the smallest dimension of these layers, when viewed from above.

Also as a rule, the two directions associated with each of these three orientations are given with reference to the plane of the foil on which FIG. 10 is shown.

The rightwards and leftwards directions are thus associated with the XX orientation, the forwards and backwards directions are associated with the YY orientation, and the upwards and downwards directions are associated with the ZZ orientation, with reference to the plane of the foil on which FIG. 10 is shown.

Also as a rule, a first longitudinal direction XX' directed from right to left and a second longitudinal direction XX", opposite to the first longitudinal direction XX', i.e. directed from left to right, are defined with reference to the plane of the foil on which FIG. 10 is shown. Again with reference to the plane of the foil on which FIG. 10 is shown, a first lateral direction YY' directed from front to back, a second lateral direction YY", opposite to the first lateral direction, a first frontal direction ZZ' directed from top to bottom, and a second frontal direction ZZ", opposite to the first frontal direction, are defined.

The method according to the invention firstly comprises a step wherein a stack I of alternating foils is produced, these foils being referred to hereinbelow as “anode foils” or “cathode foils” depending on the case at hand. As will be seen in more detail hereafter, each anode foil is intended to form the anode of a plurality of batteries, and each cathode foil is intended to form the cathode of a plurality of batteries. The example in FIG. 1 shows two cathode foils with unit entities 5*e*, and two anode foils with unit entities 2*e*. In practice, this stack is formed by a higher number of foils, typically between ten and one thousand. The number of cathode foils with unit entities 5*e* is identical to the number of anode foils with unit entities 2*e* used and constituting the stack I of alternating foils of opposite polarity.

In one advantageous embodiment, each of these foils has perforations 7 at the four ends thereof so that when these perforations 7 are superimposed, all of the cathodes and all of the anodes of these foils are arranged according to the invention, as will be explained in more detail hereinbelow (see FIGS. 1, 2 and 3). These perforations 7 at the four ends of the foils can be made by any suitable means, in particular on anode and cathode foils after manufacture, or on substrate foils 10, 40 before manufacture of the anode and cathode foils.

Each anode foil comprises an anode current-collecting substrate 10 coated at least in part with an active layer 20 of an anode material, hereinafter referred to as an anode layer 20. Each cathode foil comprises a cathode current-collecting substrate 40 coated at least in part with an active layer 50 of a cathode material, hereinafter referred to as a cathode layer 50. Each of these active layers can be solid, and more particularly have a dense or porous nature. Moreover, in order to prevent any electrical contact between two active layers of opposite polarity, an electrolyte layer 30 or a layer of a separator 31 subsequently impregnated with an electrolyte is disposed on the active layer of at least one of these current-collecting substrates previously coated with the active layer, in contact with the opposite active layer. The electrolyte layer 30 or the separator layer 31 can be disposed on the anode layer 20 and/or on the cathode layer 50; the electrolyte layer 30 or the separator layer 31 forms an integral part of the anode foil and/or of the cathode foil comprising same.

Advantageously, the two faces of the anode 10 or respectively cathode 40 current-collecting substrate are coated at least in part with an anode layer 20 or respectively with a cathode layer 50, and optionally with an electrolyte layer 30 or with a separator layer 31, disposed on the anode layer 20 or respectively on the cathode layer 50. In such a case, the anode 10 or respectively the cathode 40 current-collecting substrate acts as a current collector for two adjacent unit cells 100, 100'. The use of these substrates in the batteries increases the production output for rechargeable batteries with a high energy density and a high power density.

The mechanical structure of one of the anode foils is described hereinbelow, wherein the other anode foils have an identical structure. Furthermore, as will be seen hereinbelow, the cathode foils have a structure that is similar to that of the anode foils.

As shown in FIG. 2, the anode foil 2*e* with unit entities 60, 60' has a quadrilateral shape, substantially a square shape. It delimits a so-called perforated central zone 4, wherein unit entities are made, which will be described hereinbelow. With reference to the positioning of these unit entities, a so-called lateral or transverse orientation YY of the foil is defined, which corresponds to the lateral orientation of these unit entities, as well as a so-called horizontal orientation XX of the foil, perpendicular to the orientation YY. The central zone 4 is bordered by a peripheral frame 6 which is solid, i.e. free of unit entities. The function of this frame is in particular to ensure the easy handling of each foil.

The unit entities 60, 60' are distributed into lines $L_1$ to $L_y$, disposed one below the other, and into rows $R_1$ to $R_x$ disposed next to one another. By way of non-limiting examples, within the scope of the manufacture of micro-batteries of the surface-mount device type (hereinafter referred to as SMD), the anode and cathode foils used can be 100 mm×100 mm wafers. Typically, the number of lines of these foils is comprised between 10 and 500, whereas the number of rows is comprised between 10 and 500. As a function of the desired battery capacity, the dimensions thereof can vary and the number of lines and rows per anode and cathode foil can be adjusted accordingly. The dimensions of the anode and cathode foils used can be modulated according to requirements. As shown in FIG. 2, two adjacent lines can be separated by bridges of material 8, the height whereof, denoted $H_8$, is comprised between 0.05 mm and 5 mm. Two adjacent rows can be separated by strips of material 9, the width whereof, denoted $L_9$, is comprised between 0.05 mm and 5 mm. These bridges 8 and strips 9 of material of the anode and cathode foils give these foils sufficient mechanical stiffness for them to be easily handled.

The unit entities 60, 60', 60" comprise exclusion areas, i.e. uncoated zones 72, 82, coated zones 71, 81, and grooves 70, 80 as will be described in more detail hereinbelow. These grooves 70, 80, which are preferably I-shaped, are penetrating, i.e. they open out respectively on the top and bottom opposing faces of the foil. These grooves 70, 80 are preferably quadrilateral in shape, substantially of the rectangular type. These grooves 70, 80 can be produced in a manner known per se, directly on the current-collecting substrate, prior to any deposition of anode or cathode materials by chemical etching, by electroforming, by laser cutting, by microperforation or by stamping. These grooves 70, 80 can also be made: (i) on current-collecting substrates at least partially coated with a layer of anode or cathode materials, or (ii) on current-collecting substrates at least partially coated with a layer of anode or cathode materials, itself coated with an electrolyte layer or with a separator layer, i.e. on anode or cathode foils.

When the grooves 70, 80 are made in such at least partially coated substrates, the grooves 70, 80 can be made in a manner known per se, for example by laser cutting (or laser ablation), by femtosecond laser cutting, by microperforation or by stamping. The grooves 70, made in all of the cathode foils, are superimposed on top of one another. The grooves 80, made in all of the anode foils, are superimposed on top of one another.

One of the unit entities 60 as shown in FIG. 3 will now be described, wherein all of the unit entities 60, 60' of the anode foil are identical and that all of the unit entities 60, 60" of the cathode foil are identical.

FIG. 3 shows an anode unit entity 60, 60'. Each unit entity 60, 60', 60" comprises a penetrating groove 80, 70, that is preferably I-shaped, an exclusion area, i.e. an uncoated zone 82, 72, and a coated zone 81, 71. A coated zone 81 of an anode unit entity 60' is understood to mean the zone of the anode foil that is covered by an anode layer 20 or that is covered by an anode layer 20 and an electrolyte layer 30 or a separator layer 31. An exclusion area or uncoated zone 82 of an anode unit entity 60' is understood to mean the zone of the anode foil that is not covered by an anode layer 20 or that is not covered by an anode layer 20 and an electrolyte layer 30 or a separator layer 31.

The anode exclusion areas 82 are zones that are free of any electrolyte material or separator and free of any anode material. When produced on the anode foils, these anode exclusion areas 82 are created in such a way as to remove or prevent the deposition of any electrolyte material or separator, of any anode material, and to leave at least part of the anode current-collecting substrate 10. As a result, in a first longitudinal direction XX' of the battery, each anode current-collecting substrate 10 protrudes from each anode layer 20, and from each layer of electrolyte material 30 or layer of a separator impregnated with an electrolyte 31. When the current-collecting substrates are completely covered with an anode layer 20, itself 20 optionally covered with an electrolyte layer 30 or with a separator layer 31, the anode exclusion areas 82 can be produced by laser ablation in order to locally remove the anode layer 20 or the anode layer 20 coated with an electrolyte layer 30 or with a separator layer 31. The anode exclusion areas 82 can also be produced, in a manner known per se, by local slot-die coating of the current-collecting substrate.

The local slot-die coating of the current-collecting substrate allows for local deposition, on the substrate, in particular of an anode layer 20, optionally subsequently covered according to the same method with an electrolyte layer 30 or with a separator layer 31. Slot-die coating on the substrate with symmetry in the direction of travel of the substrate allows uncoated zones 82 to be directly left on the substrate; this reduces the number of steps in the method for manufacturing the unit entities on the anode foils.

The exclusion area 82, 72 on the one hand, and the groove 80, 70 of the same unit entity 60, 60', 60" on the other hand, are symmetrical with one another when viewed from overhead, with respect to the centre line of the unit entities 60, 60', 60", which is denoted by YH.

Each anode exclusion area 82 is produced in the continuation of each cathode groove 70 and each cathode exclusion area 72 is produced in the continuation of each anode groove 80.

The anode foil obtained after producing grooves 80, coated zones 81 and exclusion areas 82 is hereinafter referred to as an anode foil with unit entities **2*e***.

The following references are used:

$H_{80}$ is height of the entire anode groove, which is typically comprised between 0.25 mm and 10 mm;

$L_{80}$ is the width thereof, which is typically comprised between 0.25 mm and 10 mm;

$H_{82}$ is the height of each anode exclusion area, which is typically comprised between 0.25 mm and 10 mm;

$L_{82}$ is the width of each anode exclusion area, which is typically comprised between 0.25 mm and 10 mm.

Similarly, each cathode foil is also provided with different lines and rows of cathode unit entities 60, 60", provided in equal quantities to the anode unit entities 60, 60'.

As shown in particular in FIG. 4, the structure of each cathode unit entity 60" is substantially similar to that of each anode unit entity 60', i.e. this cathode unit entity 60" comprises an exclusion area or uncoated zone 72, a coated zone 71 and a groove 70.

An exclusion area or uncoated zone 72 of a cathode unit entity 60" is understood to mean the zone of the cathode foil **5*e* that is not covered by a cathode layer 50 or that is not covered by a cathode layer 50 and an electrolyte layer 30 or a separator layer 31**.

A coated zone 81 of a cathode unit entity 60" is understood to mean the zone of the cathode foil **5*e* that is covered by a cathode layer 50 or that is covered by a cathode layer 50 and by an electrolyte layer 30 or a separator layer 31. The dimensions of the cathode exclusion areas 72 are identical to those of the anode grooves 80 and, similarly, the dimensions of the anode exclusion areas 82 are similar to those of the cathode grooves 70. When viewed from overhead, the cathode exclusion areas 72 are superimposed on top of the anode grooves 80 and the anode exclusion areas 82 are superimposed on top of the cathode grooves 70**.

The only differences between the anode 60' and cathode 60" unit entities are that, on the one hand, the cathode exclusion areas 72 and the anode exclusion areas 82 are inverted relative to one another. On the other hand, the cathode grooves 70 and the anode grooves 80 are inverted relative to one another. In this manner, when viewed from overhead, each anode exclusion area 82 is produced in the continuation of each cathode groove 70 and each cathode exclusion area 72 is produced in the continuation of each anode groove 80.

The cathode exclusion areas 72 are zones that are free of any electrolyte material or separator and free of any cathode material. When produced on the cathode foils, these cathode exclusion areas 72 are created in such a way as to remove or prevent the deposition of any electrolyte material or separator, of any cathode material, and to leave at least part of the anode current-collecting substrate 10. In this manner, in the second longitudinal direction XX" of the battery, opposite the first longitudinal direction XX', each cathode current-collecting substrate 40 protrudes from each cathode layer 50, and from each layer of electrolyte material 30 or layer of a separator impregnated with an electrolyte 31. When the current-collecting substrates are completely covered with a cathode layer 50, itself 50 optionally covered with an electrolyte layer 30 or with a separator layer 31, the cathode exclusion areas 72 can be produced by laser ablation in order to locally remove the cathode layer 50 or the cathode layer 50 coated with an electrolyte layer 30 or with a separator layer 31. The cathode exclusion areas 72 can also be produced by local slot-die coating of the current-collecting substrate. The local slot-die coating of the current-collecting substrate allows for local deposition, on the substrate, in particular of a cathode layer 50, optionally subsequently covered according to the same method with an electrolyte layer 30 or with a separator layer 31. Slot-die coating on the substrate with symmetry in the direction of travel of the substrate allows uncoated zones 72 to be directly left on the substrate; this reduces the number of steps in the method for manufacturing the unit entities on the cathode foils.

The cathode foil obtained after producing grooves 70, coated zones 71 and exclusion areas 72 is hereinafter referred to as a cathode foil with unit entities 5*e*.

A stack I alternating at least one anode foil with unit entities 2*e* and at least one cathode foil with unit entities 5*e* is then produced so as to obtain at least one unit cell, each unit cell successively comprising an anode current-collecting substrate 10, an anode layer 20, a layer of an electrolyte material 30 or a layer of a separator impregnated or subsequently impregnated with an electrolyte 31, a cathode layer 50, and a cathode current-collecting substrate 40.

The stack I comprises an alternating arrangement of at least one anode foil 2*e* having grooves 80, uncoated zones 82 and coated zones 81 and of at least one cathode foil 5*e* having grooves 70, uncoated zones 72 and coated zones 71. At least one unit cell 100 is thus obtained, successively comprising an anode current-collecting substrate 10, an anode layer 20, a layer of an electrolyte material 30 and/or a separator layer 31, a cathode layer 50, and a cathode current-collecting substrate 40.

This stack I is produced such that:

- in the first longitudinal direction XX' of the battery, each anode current-collecting substrate 10 protrudes from each anode layer 20, from each layer of electrolyte material 30 and/or separator layer 31, from each cathode layer 50 and from each cathode current-collecting substrate layer 40, and
- in the second longitudinal direction XX" of the battery that is opposite to said first longitudinal direction XX', each cathode current-collecting substrate 40 protrudes from each anode layer 20, from each layer of electrolyte material 30 and/or separator layer 31, from each cathode layer 50 and from each anode current-collecting substrate layer 10.

In the case where said battery comprises a plurality of unit cells 100, 100', 100", said unit cells 100, 100', 100" are disposed one below the other, i.e. superimposed according to a frontal orientation ZZ relative to the main plane of the battery as shown in FIG. 10, wherein preferably:

- the anode current-collecting substrate 10 is the anode current-collecting substrate 10 of two adjacent unit cells 100, 100', 100", and
- the cathode current-collecting substrate 40 is the cathode current-collecting substrate 40 of two adjacent unit cells 100, 100', 100".

It is assumed that the stack, described hereinabove, is subjected to steps ensuring the overall mechanical stability thereof. These steps, which are known per se, in particular include hot pressing the different layers. As will be seen hereinbelow, this stack, consolidated in this manner, allows for the formation of individual batteries, the number whereof is equal to the product of the number of lines Y and the number of rows X.

For this purpose, with reference to FIG. 5, three lines $L_{n-1}$ to $L_{n+1}$ and three rows $R_{n-1}$ to $R_{n+1}$ have been shown. In accordance with the invention, and when the stack I comprises a plurality of lines, i.e. at least two lines of unit entities, also referred to hereinafter as a battery line $L_n$, a first pair of cuts $DX_n$ and $DX'_n$ is made to separate a given line $L_n$ of batteries 1000 from at least one other line $L_{n-1}$, $L_{n+1}$ of batteries formed from said consolidated stack, as shown in FIGS. 16 and 17. Each cut, which is made in a penetrating manner, i.e. it extends through the entire height of the stack, is made in a manner known per se. Non-limiting examples include cutting by sawing, in particular cutting into cubes, guillotine cutting or laser cutting. Moreover, the zones 90 of the foils in the stack that do not form the batteries are shown filled with solid lines, whereas the volume of the grooves is left blank and that of the exclusion areas is grey.

As shown in particular in FIG. 6, which is a larger scale view of one of the unit entities 60, 60' in FIG. 5, each cut is made in the longitudinal orientation of the battery, in the first longitudinal direction XX' or in the second longitudinal direction XX", indifferently. The cuts $DX_n$ and $DX'_n$ are preferably parallel to one another and are preferably made perpendicular to both the alignment of the grooves 80, 70 and of the exclusion areas 72, 82 of the unit entities 60, 60', 60".

Referring back to FIG. 5, each final battery is delimited, at the front and at the back, by the two cuts $DX_n$ and $DX'_n$, preferably parallel to one another, and, at the right and at the left, by a second pair of cuts $DY_n$ and $DY'_n$, preferably parallel to one another.

In this FIG. 5, the batteries 1000, once cut along the cutting lines $D_n$ and $D'_n$ and along the cutting lines $DY_n$ and $DY'_n$, are shown hatched.

Under these conditions, with reference to this FIG. 6, in the form of non-limiting examples, the following references are noted:

- the distance Dca, which corresponds to the smallest distance between the first longitudinal face F6 of a battery comprising at least one anode connection zone 1002 and the first end plane DYa. This distance Dca is comprised between 0.01 mm and 0.05 mm, wherein this distance Dca is less than or equal to $L_{82}/L_{70}$; and
- the distance Dcc, which corresponds to the smallest distance between the second longitudinal face F4 of a battery comprising at least one cathode connection zone 1006 and the second end plane DY'a. This distance Dcc is comprised between 0.01 mm and 0.05 mm, wherein this distance Dcc is less than or equal to $L_{72}/L_{80}$.

FIG. 7 is a sectional view, taken according to a cutting line VII-VII which extends through the battery. FIG. 7 shows the alternating arrangement of two anode foils with unit entities 2*e*, and of two cathode foils with unit entities 5*e*. In the same figure, the following reference numerals are given: the grooves 70, 80, the coated zones 71, 81 and the exclusion areas 72, 82 of the unit entities 60, 60', also shown in FIG. 6, as well as adjacent unit cells according to one advantageous embodiment of the invention.

The anode foil with unit entities **2*e* comprises an anode current-collecting substrate 10 coated with an anode layer 20, itself optionally coated with an electrolyte layer 30 or with a layer of a separator 31 subsequently impregnated with an electrolyte. Each cathode foil with unit entities 5*e* comprises a cathode current-collecting substrate 40 coated with an active layer of a cathode material 50, itself optionally coated with an electrolyte layer 30 or with a layer of a separator 31 subsequently impregnated with an electrolyte. In order to prevent any electrical contact between two active layers of opposite polarity, i.e. between the anode layer 20 and the cathode layer 50, at least one electrolyte layer 30 and/or at least one layer of a separator 31 impregnated or subsequently impregnated with an electrolyte is/are disposed. FIG. 7 shows a unit cell 100 successively comprising an anode current-collecting substrate 10, an anode layer 20, at least one layer of an electrolyte material 30 or a layer 31 of a separator impregnated or subsequently impregnated with an electrolyte, a cathode layer 50, and a cathode current-collecting substrate 40**.

Advantageously, the anode current-collecting substrate 10 of a unit cell 100' can be adjoined to the anode current-collecting substrate 10 of the adjacent unit cell 100". Similarly, the cathode current-collecting substrate 40 of a unit cell 100 can be adjoined to the cathode current-collecting substrate 40 of the adjacent unit cell 100'.

In one advantageous embodiment, the anode current-collecting substrate 10, respectively cathode current-collecting substrate 40, can serve as a current collector for two adjacent unit cells, as shown in particular in FIG. 7. As explained hereinabove, the two faces of the anode 10 or respectively cathode 40 current-collecting substrate are coated with an anode layer 20 or respectively with a cathode layer 50, and optionally with an electrolyte layer 30 or with a separator layer 31, disposed on the anode layer 20 or respectively on the cathode layer 50. This increases the production output for the batteries.

As shown in FIG. 7, each anode foil with unit entities **2*e* and cathode foil with unit entities 5*e* are arranged such that each cathode exclusion area 72 is made in the continuation of each anode groove 80 and such that each anode exclusion area 82 is made in the continuation of each cathode groove 70**.

In the first longitudinal direction XX', each anode current-collecting substrate 10 protrudes from a first end plane DYa, this first plane being defined by the first longitudinal ends of each anode layer 20, of each layer of electrolyte material 30 or separator layer 31, of each cathode layer 50 and of each cathode current-collecting substrate layer 40.

In the second longitudinal direction XX" of the battery that is opposite to said first longitudinal direction XX', each cathode current-collecting substrate 40 protrudes from each anode layer 20, from each layer of electrolyte material 30 or layer of a separator 31 impregnated or subsequently impregnated with an electrolyte, from each cathode layer 50 and from each anode current-collecting substrate layer 10.

This is a particularly advantageous feature of the invention, since it prevents the presence of short-circuits at the lateral edges of the battery, prevents leakage current, and facilitates the making of electrical contact at the anode 1002 and cathode 1006 connection zones. From a cross-sectional view, the cathode exclusion areas 72 are superimposed on top of the anode grooves 80 and the anode exclusion areas 82 are superimposed on top of the cathode grooves 70.

Advantageously, after producing the stack of the anode foils with unit entities **2*e* and of the cathode foils with unit entities 5*e*, the stack I is consolidated by heat and/or mechanical treatment (this treatment can be a thermocompression treatment, comprising the simultaneous application of a pressure and a high temperature). The heat treatment of the stack enabling the battery to be assembled is advantageously carried out at a temperature comprised between 50° C. and 500° C., preferably at a temperature below 350° C. The mechanical compression of the stack of the anode foils with unit entities 2*e* and of the cathode foils with unit entities 5*e*** to be assembled is carried out at a pressure comprised between 10 MPa and 100 MPa, preferably between 20 MPa and 50 MPa.

The production of the consolidated stack of the layers that make up the battery has just been described. Then, when the stack I comprises a plurality of lines, i.e. at least two lines of unit entities, also referred to hereinafter as battery lines $L_n$, a first pair of cuts $DX_n$ and $DX'_n$ can be made to separate a given line $L_n$ of batteries 1000 from at least one other line $L_{n-1}$, $L_{n+1}$ of batteries formed from said consolidated stack. Each cut, which is made in a penetrating manner, i.e. it extends through the entire height of the stack, is made in a manner known per se, as indicated hereinabove. As shown in FIG. 17, the battery line $L_n$ has six faces, i.e.:

- two so-called end faces FF1, FF2 opposite one another, in particular parallel to one another, generally parallel to the one or more anode current-collecting substrates 10, to the one or more anode layers 20, to the one or more layers of an electrolyte material 30 or to the one or more layers of a separator impregnated with an electrolyte 31, to the one or more cathode layers 50, and to the one or more cathode current-collecting substrates 40,
- two so-called lateral faces FF3, FF5 opposite one another, in particular parallel to one another and parallel to the lateral faces F3, F5 of the battery 1000, and
- two so-called longitudinal faces FF4, FF6 opposite one another, in particular parallel to one another and parallel to the longitudinal faces F4, F6 of the battery 1000.

When a separator is used as an electrolyte host matrix, the previously obtained consolidated stack or the line $L_n$ of batteries 1000 can be impregnated when the initial stack I comprises a plurality of lines of batteries $L_n$ and when a first pair of cuts (DXn, DX'n) has been made in order to separate the given line ($L_n$) of batteries (1000) from at least one other line ($L_{n-1}$, $L_{n+1}$) of batteries (1000) formed from said consolidated stack. The impregnation of the previously obtained consolidated stack or of the line Ln of batteries 1000 can be produced by a phase carrying lithium ions such as liquid electrolytes or an ionic liquid containing lithium salts, such that said separator (31) is impregnated with an electrolyte.

After producing a consolidated stack I, optionally impregnated with a phase carrying lithium ions, this stack or the line $L_n$ of batteries 1000 is encapsulated by depositing an encapsulation system 95 to ensure the protection of the cell of the battery from the atmosphere, as shown in FIG. 8. The encapsulation system must advantageously be chemically stable, able to withstand a high temperature and impermeable to the atmosphere to fulfil its function as a barrier layer. The stack can be covered with an encapsulation system comprising:

- optionally, a first dense and insulating cover layer, preferably selected from parylene, parylene F, polyimide, epoxy resins, silicone, polyamide, sol-gel silica, organic silica and/or a mixture thereof, deposited on the stack of anode and cathode foils;
- optionally, a second cover layer consisting of an electrically insulating material, deposited by atomic layer deposition on the stack of anode and cathode foils or on said first cover layer; and
- in a particularly advantageous manner, at least a third impervious cover layer, preferably having a water vapour permeance (WVTR) of less than $10^{-5}$ g/m$^2$·d, this third cover layer being made of a ceramic material and/or a low melting point glass, preferably a glass with a melting point below 600° C., deposited at the outer periphery of the stack of anode and cathode foils or of the first cover layer, wherein this sequence of at least one second cover layer and at least one third cover layer can be repeated z times, where z≥1, and deposited at the outer periphery of at least the third cover layer, and that the last layer of the encapsulation system is an impervious cover layer, preferably having a water vapour permeance (WVTR) of less than $10^{-5}$ g/m$^2$·d, which is made of a ceramic material and/or a low melting point glass. This sequence can be repeated z times, where z≥1. It has a barrier effect, which increases as the value of z increases. The result is a stiff and impervious encapsulation, which in particular prevents water vapour from passing at the interface between the encapsulation system and the contact members (see interface A in FIG. 11).

For the purposes of the invention, an impervious layer is defined as having a water vapour permeance (WVTR) of less than $10^{-5}$ g/m$^2$·d. The water vapour permeance can be measured using a method that is the object of the U.S. Pat. No. 7,624,621 and that is also described in the publication “Structural properties of ultraviolet cured polysilazane gas barrier layers on polymer substrates” by A. Mortier et al. published in Thin Solid Films 6+550 (2014) 85-89.

Typically, the first cover layer, which is optional, is selected from the group consisting of: silicones (for example deposited by impregnation or by plasma-enhanced chemical vapour deposition from hexamethyldisiloxane (HMDSO)), epoxy resins, polyimide, polyamide, poly-para-xylylene (also called poly(p-xylylene), but better known as parylene), and/or a mixture thereof. When a first cover layer is deposited, it protects the sensitive elements of the battery from the environment thereof. The thickness of said first cover layer is preferably comprised between 0.5 μm and 3 μm.

This first cover layer is especially useful when the electrolyte and electrode layers of the battery have porosities: it acts as a planarisation layer, which also has a barrier effect. By way of example, this first layer is capable of lining the surface of the microporosities opening out onto the surface of the layer, to close off the access thereto. In this first cover layer, different parylene variants can be used. Parylene C, parylene D, parylene N (CAS 1633-22-3), parylene F or a mixture of parylene C, D, N and/or F can be used. Parylene is a dielectric, transparent, semi-crystalline material with high thermodynamic stability, excellent resistance to solvents and very low permeability. Parylene also has barrier properties. Parylene F is preferred within the scope of the present invention.

This first cover layer is advantageously obtained from the condensation of gaseous monomers deposited by chemical vapour deposition (CVD) on the surfaces of the stack of the battery, which results in a conformal, thin and uniform covering of all of the accessible surfaces of the stack. This first cover layer is advantageously stiff; it cannot be considered to be a flexible surface.

The second cover layer, which is also optional, is formed by an electrically insulating material, preferably an inorganic material. It is deposited by atomic layer deposition (ALD), by PECVD, by HDPCVD (high density plasma chemical vapour deposition) or by ICP CVD (inductively coupled plasma chemical vapour deposition) in order to obtain a conformal covering of all of the accessible surfaces of the stack previously covered with the first cover layer. The layers deposited by ALD are mechanically very fragile and require a stiff bearing surface to fulfil their protective role. The deposition of a fragile layer on a flexible surface would result in the formation of cracks, causing this protective layer to lose integrity. Furthermore, the growth of the layer deposited by ALD is influenced by the nature of the substrate. A layer deposited by ALD on a substrate having zones of different chemical natures will have inhomogeneous growth, which can cause this protective layer to lose integrity. For this reason, this optional second layer, where present, preferably bears against said optional first layer, which ensures a chemically homogeneous growth substrate.

ALD deposition techniques are particularly well suited for covering surfaces with a high roughness in a completely impervious and conformal manner. They allow for the production of conformal layers, free of defects such as holes (so-called “pinhole-free” layers) and represent very good barriers. The WVTR thereof is extremely low. The WVTR (water vapour transmission rate) is used to evaluate the water vapour permeance of the encapsulation system. The lower the WVTR, the more impervious the encapsulation system. The thickness of this second layer is advantageously chosen as a function of the desired level of imperviousness to gases, i.e. the desired WVTR, and depends on the deposition technique used, chosen in particular from among ALD, PECVD, HDPCVD and ICP CVD.

Said second cover layer can be made of a ceramic material, vitreous material or glass-ceramic material, for example in the form of an oxide, of the Al2O3 or Ta2O5 type, a nitride, a phosphate, an oxynitride or a siloxane. This second cover layer preferably has a thickness comprised between 10 nm and 10 μm, preferably between 10 nm and 50 nm.

This second cover layer deposited by ALD, PECVD, HDPCVD (high density plasma chemical vapour deposition) or ICP CVD (inductively coupled plasma chemical vapour deposition) on the first cover layer firstly makes it possible to render the structure impervious, i.e. to prevent water from migrating inside the object, and secondly makes it possible to protect the first cover layer, which is preferably made of parylene F, from the atmosphere, in particular from air and moisture, and from thermal exposure in order to prevent the degradation thereof. This second cover layer thus improves the life of the encapsulated battery.

Said second cover layer can also be deposited directly on the stack of anode and cathode foils, i.e. in the case where said first cover layer has not been deposited.

The third cover layer must be impervious and preferably has a water vapour permeance (WVTR) of less than 10-5 g/m2·d. This third cover layer is formed by a ceramic material and/or a low melting point glass, preferably a glass having a melting point below 600° C., deposited at the outer periphery of the stack of anode and cathode foils or of the first cover layer. The ceramic and/or glass material used in this third layer is advantageously chosen from among:

a low melting point glass (typically >600° C.), preferably $SiO_2$—$B_2O_3$; $Bi_2O_3$—$B_2O_3$, ZnO—$Bi_2O_3$—$B_2O_3$, $TeO_2$—$V_2O_5$, PbO—$SiO_2$, and oxides, nitrides, oxynitrides, $Si_xN_y$, $SiO_2$, SiON, amorphous silicon or SiC.

These glasses can be deposited by moulding or dip coating. The ceramic materials are advantageously deposited by PECVD or preferably by HDPCVD or ICP CVD at a low temperature; these methods allow a layer with good imperviousness to be deposited.

As described hereinabove, the battery according to the invention comprises an encapsulation system which, advantageously, is produced in the form of a succession of layers. This procures a highly impervious encapsulation on all of the faces of the battery. Moreover, this encapsulation has very small overall dimensions, which allows for the miniaturisation required to produce microbatteries.

The above description of the encapsulation system illustrates a significant difference, together with its technical effects, when compared to the disclosure of the U.S. patent document U.S. Patent Publication No. 2018/0212210 filed by Suzuki. In this battery of the prior art, the resin in contact with the cells does not fulfil an impervious encapsulation function. More specifically, this resin does not have the permeance features described hereinabove.

Furthermore, this document filed by Suzuki relates to a solid-state battery. Conversely, the battery according to the invention can be not fully solid. In such a case, the longitudinal ends of this battery are of the "open" type. As shown in particular in FIG. 9, the impervious encapsulation system is advantageously placed in direct contact with the ends of the electrolyte layer 30 or separator layer 31, at the opposite longitudinal faces F4 and F6. As a result, this encapsulation system is able to "close" the pores in the layer 30, respectively 31, which in particular allows the nano-confined electrolytes inside the cell to be satisfactorily retained. In an alternative embodiment, not shown, this encapsulation system can be provided such that it is not in contact with the other layers. However, this encapsulation preferably comes into direct contact with all of the components of the cell, with the exception of the protruding substrate, on the opposite longitudinal faces of the stack.

Furthermore, the encapsulation system of the battery according to the invention is advantageously electrically insulating. For the purpose of the invention, thus means that the conductivity of this encapsulation system is advantageously less than $10^{e-11}$ $S \cdot m^{-1}$, in particular less than $10^{e-12}$ $S \cdot m^{-1}$. Such a feature is advantageous since it avoids short circuits, while at the same time allowing the opposite positive and negative connections to be reworked for compatibility with a pick-and-place type electronic component placement machine. This feature can be compared with the disclosure of the aforementioned patent document filed by Suzuki, wherein the imperviousness is provided by an outer casing of a metallic nature.

The stack thus coated is then cut by any suitable means along the cutting lines DYn and DY'n, so as to expose the anode 1002 and cathode 1006 connection zones and obtain unit batteries as shown in FIG. 9.

As shown in FIGS. 9 and 10, the cuts in the consolidated and encapsulated stack along the cutting lines DYn and DY'n are made such that:

only each anode edge 1002' of each anode current-collecting substrate 10 protrudes from the first end plane $DY_a$, this first plane being defined by the first longitudinal ends of each anode layer 20, of each layer of electrolyte material 30 and/or separator layer 31, of each cathode layer 50 and of each cathode current-collecting substrate layer 40 in the first longitudinal direction XX' of the battery, and lies flush with a first longitudinal face F6, and such that only each cathode edge 1006' of each cathode current-collecting substrate 40 protrudes from the second end plane ($DY'_a$), this second plane being defined by the second longitudinal ends of each anode layer 20, of each layer of electrolyte material 30 and/or separator layer 31, of each cathode layer 50 and of each anode current-collecting substrate layer 10 in the second longitudinal direction XX" of the battery, and lies flush with a second longitudinal face F4, said second longitudinal face F4 preferably being opposite and parallel to the first longitudinal face F6, wherein each anode edge 1002' defines an anode connection zone 1002 and each cathode edge 1006' defines a cathode connection zone 1006.

Contact members 97, 97', 97" (electrical contacts) are added where the cathode 1006 or respectively anode 1002 connection zones are apparent. These contact zones are preferably disposed on opposite sides of the stack of the battery to collect the current (lateral current collectors). The contact members 97, 97', 97" are disposed at least on the cathode connection zone 1006 and at least on the anode connection zone 1002, preferably on the face of the coated and cut stack comprising at least the cathode connection zone 1006 and on the face of the coated and cut stack comprising at least the anode connection zone 1002 (see FIG. 11).

Thus, at least the anode connection zone 1002, preferably at least the first longitudinal face F6 comprising at least the anode connection zone 1002, and more preferably the first longitudinal face F6 comprising at least the anode connection zone 1002, and the ends 97'a of the faces F1, F2, F3, F5 adjacent to this first longitudinal face F6, are covered by an anode contact member 97', capable of producing the electrical contact between the stack I and an external conductive element. Furthermore, at least the cathode connection zone 1006, preferably at least the second longitudinal face F4 comprising at least the cathode connection zone 1006, and more preferably the second longitudinal face F4 comprising at least the cathode connection zone 1006, and the ends 97"a of the faces F1, F2, F3, F5 adjacent to this second longitudinal face F4, are covered by a cathode contact member 97", capable of producing the electrical contact between the stack I and an external conductive element.

Preferably, the contact members 97, 97', 97" are constituted, in the vicinity of the cathode 1006 and anode 1002 connection zones, by a stack I of layers successively comprising a first electrical connection layer comprising a material filled with electrically conductive particles, preferably a polymeric resin and/or a material obtained by a sol-gel method, filled with electrically conductive particles and more preferably a graphite-filled polymeric resin, and a second layer consisting of a metal foil disposed on the first layer.

The first electrical connection layer allows the subsequent second electrical connection layer to be fastened while providing "flexibility" at the connection without breaking the electrical contact when the electric circuit is subjected to thermal and/or vibratory stresses.

The second electrical connection layer is a metal foil. This second electrical connection layer is used to provide the batteries with lasting protection against moisture. In general, for a given thickness of material, metals make it possible to produce highly impervious films, more impervious than ceramic-based films and even more impervious than polymer-based films, which are generally not very impervious to the passage of water molecules. It increases the calendar life of the battery by reducing the WVTR at the contact members.

Advantageously, a third electrical connection layer comprising a conductive ink can be deposited on the second electrical connection layer; the purpose thereof is to reduce the WVTR, thus increasing the life of the battery.

The contact members 97, 97', 97" allow the electrical connections to be made alternating between positive and negative at each of the ends. These contact members 97, 97', 97" enable parallel electrical connections to be made between the different battery elements. For this purpose, only the cathode connections protrude at one end, and the anode connections are available at another end.

International Patent Publication No. WO 2016/001584 describes stacks of a plurality of unit cells, made up of anode and cathode foils stacked in an alternating manner and laterally offset (see FIG. 12), encapsulated in an encapsulation system 295 to protect the cell of the battery 2000 from the atmosphere. The cutting of these encapsulated stacks to obtain unit batteries, with exposed anode 2002 and cathode 2006 connection zones, is carried out along a cutting plane passing through an alternating succession of electrodes and encapsulation systems. Due to the difference in density between the electrode and the encapsulation system of the battery of the prior art, cutting along this cutting plane creates a risk of the encapsulation system being torn away in the vicinity of the cutting plane, and thus the creation of short-circuits. In International Patent Publication No. WO 2016/001584, during encapsulation, the encapsulation layer fills the gaps of the stack of the foils bearing the U-shaped cuts. This encapsulation layer inserted at these gaps is thick and does not adhere very well to the stack, which results in this risk of the encapsulation system 2095 being torn away during subsequent cutting.

According to the present invention, this risk is eliminated with the use of foils carrying unit entities wherein:

- in the first longitudinal direction XX', each anode current-collecting substrate 10 protrudes from the first end plane DYa, this first plane being defined by the first longitudinal ends of each anode layer 20, of each layer of electrolyte material 30 or separator layer 31, of each cathode layer 50 and of each cathode current-collecting substrate layer 40, and
- in the second longitudinal direction XX" of the battery that is opposite to said first longitudinal direction XX', each cathode current-collecting substrate 40 protrudes from each anode layer 20, from each layer of electrolyte material 30 or layer of a separator 31 impregnated or subsequently impregnated with an electrolyte, from each cathode layer 50 and from each anode current-collecting substrate layer 10.

The hot-pressed mechanical structure of unit entities is extremely rigid in the vicinity of the cut, due to the alternating superimposition of cathode and anode foils. The use of such a stiff structure, together with the use of foils bearing unit entities, allows the number of defects during cutting to be reduced, the cutting speed to be increased and thus the production output of the batteries to be improved.

According to the invention, the cuts DY'n and DYn are made through the anode foils with unit entities 2*e* and the cathode foils with unit entities 5*e* of similar density, resulting in a higher quality, clean cut. Furthermore, in the vicinity of the cutting planes $DY'_n$ and $DY_n$, the presence, in the first longitudinal direction XX', of an anode current-collecting collecting substrate 10 free of any anode material, electrolyte, separator impregnated or not impregnated with an electrolyte, cathode and cathode current-collecting substrate, as well as the presence, in the second longitudinal direction XX", of a cathode current-collecting substrate 40 free of any anode material, electrolyte, separator impregnated or not impregnated with an electrolyte, cathode and anode current-collecting substrate, prevents any risk of a short-circuit and leakage current, and facilitates the making of electrical contact at the connection zones 1002, 1006. The anode connection zones 1002 and the cathode connection zones 1006 are preferably laterally opposite one another.

The unique structure of the battery according to the invention prevents the presence of short-circuits at the longitudinal faces F4, F6 of the battery, prevents leakage current, and facilitates the making of electrical contact at the anode 1002 and cathode 1006 connection zones. More specifically, the absence of electrode materials and of electrolyte materials on the longitudinal faces F4, F6 of the battery comprising the anode and cathode connection zones, prevents the lateral leakage of lithium ions and facilitates the balancing of the battery; the effective surfaces of the electrodes in contact with one another, and delimited by the first and second end planes DYa, DY'a are substantially identical as shown in FIGS. 7 to 10.

In the alternative, and as shown in FIG. 5 and FIG. 16, batteries 1000' can be obtained according to the invention. These batteries 1000' correspond to batteries 1000 that have been rotated by 180° about the axis $Z_{1000}$ which is an axis parallel to the frontal axis ZZ passing through the centre $C_{1000}$ of the battery. The batteries 1000 and 1000' can have the same dimensions. The batteries 1000 and 1000' can have longitudinal dimensions that are identical or different from one another. The production of the batteries 1000 and 1000' in the same stack optimises the production output of the batteries while minimising material offcuts 90.

The batteries according to the invention can be made from unit entities according to different alternative embodiments of the invention. In a non-limiting example, as shown in FIG. 13, the coated zones 71, 81 of the unit entities can be produced by slot-die coating on the current-collecting substrate 40, 10 with symmetry in the direction of travel of the substrate. This allows uncoated zones 72, 82 to be directly left on the substrate and thus reduces the number of steps in the method for manufacturing the unit entities on the cathode and anode foils. The exclusion areas of each unit entity of the same row R can be common and form an exclusion strip 82' (see FIGS. 13 & 14).

As shown in FIG. 15, additional batteries 1000' can be obtained according to the invention and according to this same alternative embodiment of the invention. These batteries 1000' correspond to batteries 1000 that have been rotated by 180° about the axis 21000 which is an axis parallel to the frontal orientation ZZ passing through the centre $C_{1000}$ of the battery. The production of the batteries 1000 and 1000' in the same stack optimises the production output of the batteries while minimising material offcuts 90.

In an alternative embodiment not shown, the exclusion areas of each unit entity of a row $R_n$ can be produced from an exclusion strip that is common to each unit entity of the same row $R_n$, thus optimising the production output of the batteries while preventing the presence of material offcuts 90. The central part 4 of the stack of alternating foils is thus used in full to manufacture batteries according to the invention.

FIGS. 18 to 20 show a further embodiment of the invention. In these figures, any component elements similar to those of the first embodiment, are given the same reference numerals incremented by 300. The battery 1300, shown in FIG. 20, differs from that 1000 hereinabove, in particular in that it includes a single unit cell 400 covered by an encapsulation system 395. This single cell successively comprises, from top to bottom in FIG. 20: an anode current-collecting substrate 310, an anode layer 320 a layer of a separator impregnated with an electrolyte 331, which can be replaced by a layer of an electrolyte material as described hereinabove, a cathode layer 350, and a cathode current-collecting substrate 340.

With reference to this FIG. 18, the different components of the cell are firstly placed on top of one another. This architecture is generally obtained by localised deposition on the substrate. A part of the current collector is not covered by the deposit. The current-collecting substrates 310 and 340, provided on the opposite end faces F1, F2, are disposed such that the opposite ends thereof protrude from the other layers on the opposite longitudinal faces F4, F6. Then, as shown in FIG. 19, these components are covered by the encapsulation system 395.

Cuts are then made, along the vertical lines 392 and 393 shown in this FIG. 19. As shown in FIG. 20, the aforementioned cuts expose the edges 311 and 341 of the respective current-collecting substrates 310 and 340. It should be noted that these edges are covered by zones 394 and 396 of the encapsulation system 395, which protrude in the longitudinal orientation XX, in the two opposite directions.

FIG. 21 shows yet another embodiment of the invention. In these figures, any component elements similar to those of the first embodiment, are given the same reference numerals incremented by 400.

The battery 1400 in this FIG. 21 comprises, similarly to the battery 1000, a plurality of unit cells 500 disposed one below the other in the frontal orientation ZZ. As opposed to this battery 1000, the battery 1400 has an encapsulation system 495, which is similar to that 395 described immediately hereinabove. In particular, this system 495 has a plurality of zones 494 and 496 protruding in the orientation XX. As with the battery 1300, these zones 494 and 496 are formed by making cuts 492, 493, which are shown as vertical dot and dash lines in FIG. 21. These cuts expose the edges 411 and 441, belonging to the different current-collecting substrates 410 and 440.

FIGS. 22 to 24 show a further embodiment of the invention, which must be compared to that shown in FIGS. 18 to 20. In FIGS. 22 to 24, the component elements that are similar to those of the embodiment shown in FIGS. 18 to 20, are given the same reference numerals incremented by 200.

In a similar manner to the battery 1300, the battery 1500 shown in FIG. 24 includes a single unit cell 600, covered by an encapsulation system 595. This single cell successively comprises, from top to bottom in FIG. 24: an anode current-collecting substrate 510, an anode layer 520, a layer of a separator impregnated with an electrolyte 531, which can be replaced by a layer of an electrolyte material as described hereinabove, a cathode layer 550, and a cathode current-collecting substrate 540.

However, the battery 1500 differs from that 1300, firstly in that the current-collecting substrates 510 and 540 do not protrude in the longitudinal orientation XX from the other layers. Moreover, this battery 1500 is equipped with two additional components, i.e. electrical connection members 560 and 570, which are provided on the opposite end faces of the cell 600. Each of these connection members, which are in particular identical to one another, typically has a thickness of less than 300 μm, preferably less than 100 μm.

Each connection member is advantageously made of an electrically conductive material, in particular a metal material. This in particular includes aluminium, copper or a stainless steel. In order to improve the weldability thereof, these materials can be coated with a thin layer of gold, nickel or tin.

The means of attachment between, on the one hand, the connection member 560 and the current collector 510 and, on the other hand, the connection member 570 and the current collector 540 will now be described. These means of attachment are typically formed by a conductive adhesive, in particular a graphite adhesive, or an adhesive charged with copper or aluminium metal nanoparticles. This conductive adhesive layer, which is not shown in FIG. 24, has a typical thickness of 0.1 micrometres to several micrometres. Alternatively, this conductive adhesive layer can be replaced by a weld.

As shown in FIG. 22, each connection member 560, 570 is placed on its respective collector substrate 510, 540 in an offset manner in the longitudinal orientation. More precisely, the first ends of these connection members define tabs 562, 572, protruding in two opposite directions from the longitudinal faces F4 and F6 of the cell. Furthermore, at the end thereof opposite these tabs, each connection member is set back from the cell so as to define a respective shoulder 564, 574. This arrangement, which is an advantageous optional feature, makes it easier to visually distinguish the connection members from the other layers.

The cell 600, equipped with the connection members, is then covered with the encapsulation system. As shown in FIG. 23, the longitudinal and lateral faces of the cell, and the shoulders 564 and 574, are firstly covered with a partial encapsulation system 595'. With reference to FIG. 24, the end faces of the connection members are then covered to form the final encapsulation system 595. Finally, cuts are made, which are not shown but which are similar to the cuts 392, 393 in FIG. 19. This exposes the edges 566 and 576 of the connection members. In this example, the encapsulation system is provided in two successive steps, wherein a single step can also be provided.

FIG. 25 shows an alternative embodiment of that shown in FIGS. 22 to 24. In this FIG. 25, the component elements that are similar to those shown in FIGS. 22 to 24, are given the same reference numerals incremented by 100. As shown hereinabove, the electrical connection members 560 and 570 protrude from the cell in two opposite directions in the longitudinal orientation. By contrast, the electrical connection members 660 and 670 of the battery 1600, shown in FIG. 25, both protrude in the same direction, i.e. to the right in this figure.

There are specific advantages to the embodiments shown in FIGS. 18 to 20 and in FIGS. 22 to 25. More specifically, they relate to "single cell" type batteries, which are well-suited to certain applications requiring a high energy density. Furthermore, such an architecture facilitates encapsulation operations.

Finally, the embodiments shown in FIGS. 22 to 25 relate to the use of electrical connection members that also have specific advantages. This thus prevents the need for localised deposits on the substrate, such that the entire surface of this current-collecting substrate can be coated by electrode material. Since the lateral offset is produced at the connection members, there is no longer any need to make localised deposits on the current collectors, as is in particular the case for the embodiment in FIGS. 18 to 20.

With reference to these embodiments in FIGS. 22 to 25, the invention further relates to a battery 1500 comprising a stack formed by at least one unit cell, in particular by a single unit cell 600, each unit cell successively comprising an anode current-collecting substrate 510, an anode layer 520, at least one layer of an electrolyte material 530 and/or at least one layer of a separator impregnated with an electrolyte 531, a cathode layer 550, and a cathode current-collecting substrate 540, said stack and said battery having six faces, i.e.:

- two so-called end faces (F1, F2) opposite one another, generally parallel to said layers and to said current-collecting substrates,
- two so-called longitudinal faces (F4, F6) opposite one another, comprising anode and cathode connection zones respectively, and
- two so-called lateral faces opposite one another.

The battery being characterised in that it further comprises two electrical connection members 560, 570, provided on the opposite end faces of the stack, a first end 562, 572 of each electrical connection member protruding, in the longitudinal orientation XX, beyond a respective longitudinal face F4, F6 of the stack.

According to other features of this battery according to this additional object of the invention: (i) the first end 562 of a connection member 560 protrudes in a first direction, beyond a first longitudinal face F4, whereas the first end 572 of the other connection member 570 protrudes, in the opposite direction, from the other longitudinal face F6, (ii) the first end 662, 672 of the two connection members 660, 670 protrudes in the same direction, beyond one and the same longitudinal face F4, (iii) each electrical connection member is attached to a respective current-collecting substrate, in particular by means of a conductive adhesive, (iv) none of the current-collecting substrates, as well as the anode, cathode and separator layers, protrude beyond the longitudinal faces of the stack, and opposite the protruding end, each electrical connection member delimits a shoulder 564, 574 with said stack.

The method according to the invention is particularly adapted to the manufacture of all-solid-state batteries, i.e. batteries whose electrodes and electrolyte are solid and do not comprise a liquid phase, even impregnated in the solid phase. The method according to the invention is particularly adapted to the manufacture of batteries considered to be quasi-solid-state comprising at least one separator 31 impregnated with an electrolyte. The separator is preferably a porous inorganic layer having: (i) a porosity, preferably mesoporous, that is greater than 30%, preferably comprised between 35% and 50%, and more preferably between 40% and 50%, and (ii) pores with an average diameter $D_{50}$ of less than 50 nm.

The thickness of the separator is advantageously less than 10 μm, preferably comprised between 2.5 μm and 4.5 μm, so as to reduce the final thickness of the battery without weakening the properties thereof. The pores of the separator are impregnated with an electrolyte, preferably with a phase carrying lithium ions such as liquid electrolytes or an ionic liquid containing lithium salts. The "nano-confined" or "nano-entrapped" liquid in the porosities, and in particular in the mesoporosities, can no longer escape. It is bound by a phenomenon referred to herein as "absorption in the mesoporous structure" (which does not seem to have been described in the literature within the context of lithium-ion batteries) and it can no longer escape, even when the cell is placed in a vacuum. The battery is thus considered to be a quasi-solid-state battery.

The battery according to the invention can be a lithium-ion microbattery, a lithium-ion mini-battery, or a high-power lithium-ion battery. In particular, it can be designed and dimensioned to have a capacity of less than or equal to about 1 mA h (commonly known as a "microbattery"), to have a power of greater than about 1 mA h up to about 1 A h (commonly known as a "mini-battery"), or to have a capacity of greater than about 1 A h (commonly known as a "high-power battery"). Typically, microbatteries are designed to be compatible with methods for manufacturing microelectronics.

The batteries of each of these three power ranges can be produced: (i) with layers of the "solid-state" type, i.e. without impregnated liquid or paste phases (said liquid or paste phases can be a lithium-ion conductive medium, capable of acting as an electrolyte), or (ii) with layers of the mesoporous "solid-state" type, impregnated with a liquid or paste phase, typically a lithium-ion conductive medium, which spontaneously penetrates the layer and no longer emerges therefrom, so that the layer can be considered to be quasi-solid, or (iii) with impregnated porous layers (i.e. layers with a network of open pores which can be impregnated with a liquid or paste phase, which gives these layers wet properties).

REFERENCE SYMBOLS

The following references are used in these figures and in the description hereinbelow:

1000, 1000' Battery according to the invention
1002 Anode connection zone
1002' Anode edge of each anode current-collecting substrate
1006 Cathode connection zone
1006' Cathode edge of each cathode current-collecting substrate
100, 100', 100" Unit cell
10 Anode current-collecting substrate
20 Anode layer
30 Layer of an electrolyte material/Electrolyte layer
31 Layer of a separator impregnated or subsequently impregnated with an electrolyte/Separator layer
40 Cathode current-collecting substrate
50 Cathode layer
60 Unit entity
60' Anode unit entity
60" Cathode unit entity
70 I-shaped grooves in the cathode foils, cathode groove
H70 Overall height of the I-shaped cathode groove 70
L70 Overall width of the I-shaped cathode groove 70
71 Coated zone in the cathode foil
72 Exclusion area/Uncoated zone in the cathode foil/Cathode exclusion area
L72 Overall width of the exclusion area/uncoated zone 72 in the cathode foil
H72 Overall height of the exclusion area/uncoated zone 72 in the cathode foil
L71 Overall width of the coated zone in the cathode foil
80 I-shaped grooves in the anode foils, anode groove
H80 Overall height of the I-shaped anode groove 80
L80 Overall width of the I-shaped anode groove 80
81 Coated zone in the anode foil
82 Exclusion area/Uncoated zone in the anode foil/Anode exclusion area
82' Exclusion strip
L81 Overall width of the coated zone in the anode foil
H81 Overall height of the coated zone in the anode foil
L82 Overall width of the exclusion area/uncoated zone 82

H82 Overall height of the exclusion area/uncoated zone 82

90 Material offcuts

95 Encapsulation system

97 Contact member

97' Anode contact member

97'a Anode contact member pin covering the ends of the faces F1, F2, F3, F5 adjacent to the longitudinal face F6

97" Cathode contact member

97"a Cathode contact member pin covering the ends of the faces F1, F2, F3, F5 adjacent to the longitudinal face F4

Dca The smallest distance between the first longitudinal face F6 of a battery 1000 comprising at least one anode connection zone 1002 and the first end plane DYa Dcc The smallest distance between the second longitudinal face F4 of a battery 1000 comprising at least one cathode connection zone 1006 and the second end plane DY'a Dca' The smallest distance between the first longitudinal face of a battery 1000' comprising at least one anode connection zone and the first end plane defined by the first longitudinal ends of each anode layer, of each layer of electrolyte material or separator layer, of each cathode layer and of each cathode current-collecting substrate layer Dcc' The smallest distance between the second longitudinal face of a battery 1000' comprising at least one cathode connection zone and the second end plane defined by the first longitudinal ends of each anode layer, of each layer of electrolyte material or separator layer, of each cathode layer and of each anode current-collecting substrate layer I1000 Width of the battery L1000 Length of the battery C1000 Centre of the battery 1000

Z1000 Axis parallel to the frontal orientation ZZ of the battery and passing through the centre C1000 of the battery 1000.

R1000 Rotation of the battery 1000 about Z1000

I Stack of substrate foils, covered with an electrode layer (anode or cathode) and with an electrolyte foil or with a foil of a separator impregnated or subsequently impregnated with an electrolyte/Stack of at least one unit cell

2*e* Anode foil with unit entities

5*e* Cathode foil with unit entities

4 Perforated central zone of the anode foil with unit entities

6 Peripheral frame of the anode foil with unit entities

7 Perforations present at the four ends of the foils of substrate, anode, cathode, electrolyte or separator impregnated or subsequently impregnated with an electrolyte

8 Material bridges between two lines

H8 Height of the bridges

9 Material strips between two rows

L9 Width of the strips

XX Longitudinal or horizontal orientation of the stack/of the battery

YY Lateral or transverse orientation of the stack/of the battery

ZZ Frontal orientation of the stack/of the battery

L, Ln, Ln−1, Ln+1 Line of the unit entities/battery line

R, Rn, Rn−1, Rn+1 Row of the unit entities

DYn−1, DY'n−1, DYn, DY'n, DYn+1, DY'n+1 Cuts

DXn−1, DX'n−1, DXn, DX'n, DXn+1, DX'n+1 Cuts

DYa First end plane of a battery defined by the first longitudinal ends of each anode layer, of each layer of electrolyte material or separator layer, of each cathode layer and of each cathode current-collecting substrate layer.

DY'a Second end plane of a battery defined by the second longitudinal ends of each anode layer, of each layer of electrolyte material or separator layer, of each cathode layer and of each anode current-collecting substrate layer.

2000 Battery according to the prior art

200, 200', 200" Unit cell of a battery according to the prior art

2002 Anode connection zone of a battery according to the prior art

2006 Cathode connection zone of a battery according to the prior art

295 System for encapsulating a battery according to the prior art

YH Lateral centre line of the unit entities

F1, F2 End faces of the stack I/of the battery 1000

F3, F5 Lateral faces of the stack I/of the battery 1000

F4, F6 Longitudinal faces of the stack I/of the battery 1000

FF1, FF2 End faces of the battery line Ln

FF3, FF5 Lateral faces of the battery line Ln

FF4, FF6 Lateral faces of the battery line $L_n$

The invention claimed is:

1. A battery, comprising:

a plurality of unit cells defining a stack, each unit cell in the plurality of unit cells taken individually successively including:

an anode layer, at least one layer of an electrolyte material and/or at least one layer of a separator impregnated with an electrolyte, and a cathode layer, wherein each unit cell in the plurality of unit cells is connected to: an anode current-collecting substrate disposed on the anode layer, and a cathode current-collecting substrate disposed on the cathode layer, the plurality of unit cells being disposed one below another according to a frontal orientation relative to a main plane of the battery in a manner such that:

at least one unit cell shares the anode current-collecting substrate the anode current-collecting substrate with a first adjacent unit cell, and the at least one unit cell shares the cathode current-collecting substrate the cathode current-collecting substrate with a second adjacent unit cell, wherein the stack has a plurality of faces that include:

two end faces opposite one another in a parallel orientation, and generally parallel to each anode current-collecting substrate, to each anode layer, to each electrolyte material or to each at least one layer of a separator impregnated with an electrolyte, to each cathode layer, and to each cathode current-collecting substrate, two lateral faces opposite one another in a parallel orientation, and two longitudinal faces opposite one another in a parallel orientation, a first longitudinal face of the two longitudinal faces including at least one anode connection zone, and a second longitudinal face of the two longitudinal faces including at least one cathode connection zone that is laterally opposite to the at least one anode connection zone, wherein:

in a first longitudinal direction of the battery, each anode current-collecting substrate protrudes from each anode layer, from each at least one layer of electrolyte material or each at least one layer of the separator impregnated with the electrolyte, from each cathode layer, and from each cathode current-collecting substrate layer, and in a second longitudinal direction of the battery that is opposite to the first longitudinal direction, each cathode current-collecting substrate protrudes from each anode layer, from each at least one layer of electrolyte material or each at least one layer of the separator impregnated with the electrolyte, from each cathode layer, and from each anode current-collecting substrate layer, an encapsulation system completely covering an outer periphery of the stack, the encapsulation system including at least one impervious cover layer having a water vapour permeance (WVTR) of less than $10^{-5}$ g/m$^2$·d, the encapsulation system, at each longitudinal face, being in direct contact with each layer of electrolyte material or each layer of the separator impregnated with the electrolyte.

2. The battery of claim 1, wherein each anode current-collecting substrate protrudes from a first end plane defined by first longitudinal ends of:

each anode layer, each at least one layer of electrolyte material or each at least one layer of the separator impregnated with the electrolyte, each cathode layer, and each cathode current-collecting substrate layer.

3. The battery of claim 1, wherein each cathode current-collecting substrate protrudes from a second end plane defined by second longitudinal ends of:

each anode layer, each at least one layer of electrolyte material or each at least one layer of the separator impregnated with the electrolyte, each cathode layer, and each anode current-collecting substrate layer.

4. The battery of claim 1, wherein the encapsulation system is also in direct contact at each longitudinal face, with the anode layer, the cathode layer, and a non-protruding current-collecting substrate.

5. The battery of claim 1, wherein the encapsulation system is electrically insulating and has a conductivity that is less than $10^{e}$−12 S·m$^{-1}$.

6. The battery of claim 1, wherein:

the encapsulation system covers end faces of the stack, the lateral faces, and at least part of the longitudinal faces such that:

only each anode edge of each anode current-collecting substrate protruding from each anode layer, from each at least one layer of electrolyte material or each at least one layer of the separator impregnated with the electrolyte, from each cathode layer, and from each cathode current-collecting substrate layer in the first longitudinal direction of the battery, lies flush with the first longitudinal face, and only each cathode edge of each cathode current-collecting substrate protruding from each anode layer, from each at least one layer of electrolyte material or each at least one layer of the separator impregnated with the electrolyte, from each cathode layer, and from each anode current-collecting substrate layer in the second longitudinal direction of the battery, lies flush with the second longitudinal face, the second longitudinal face being opposite and parallel to the first longitudinal face, and each anode edge defines an anode connection zone and each cathode edge defines a cathode connection zone.

7. The battery of claim 1, wherein:

the encapsulation system comprises:

a first cover layer deposited on at least part of the outer periphery of the stack, the first cover layer being chosen from among parylene, parylene F, polyimide, epoxy resins, silicone, polyamide, sol-gel silica, organic silica and/or a mixture thereof, a second cover layer deposited by atomic layer deposition on at least part of the outer periphery of the stack or the first cover layer, the second cover layer composed of an electrically insulating material, a third impervious cover layer deposited on at least part of the outer periphery of the stack or the first cover layer, the third impervious cover layer composed of a ceramic material and/or a low melting point glass having a melting point below 600° C., the third impervious cover layer having a water vapour permeance (WVTR) of less than 10-5 g/m2·d.

8. The battery of claim 1, wherein:

the first longitudinal face comprising at least the anode connection zone is covered by an anode contact member, the second longitudinal face comprising at least the cathode connection zone is covered by a cathode contact member, the anode contact member and the cathode contact member produce an electrical contact between the stack and an external conductive element.

9. The battery of claim 8, wherein the anode contact member and the cathode contact member each comprises:

a first electrical connection layer, disposed on the first longitudinal face, respectively on and the second longitudinal face, the first electrical connection layer comprising a graphite-filled polymeric resin a second electrical connection layer comprising a metal foil disposed on the first electrical connection layer.

10. The battery of claim 1, wherein:

a smallest distance between the first longitudinal face and a first end plane defined by the first longitudinal ends of each anode layer, each at least one layer of electrolyte material and/or each at least one layer of the separator impregnated with the electrolyte, each cathode layer, and each cathode current-collecting substrate layer, is between 0.01 mm and 0.5 mm, and/or a smallest distance between the second longitudinal face and the second end plane defined by the second longitudinal ends of each anode layer, of each at least one layer of electrolyte material and/or each at least one layer of the separator impregnated with the electrolyte, each cathode layer, and each anode current-collecting substrate layer, is between 0.01 mm and 0.5 mm.

11. The battery of claim 7, wherein:

the encapsulation system comprises a succession of second cover layer and of third cover layer repeated z times, where z≥1, each new second layer being deposited on the outer periphery of at least the previous third cover layer, and the last layer of the encapsulation system is made of a ceramic material and/or a low melting point glass.

12. The battery of claim 8, wherein the last layer of the encapsulation system has a water vapor permeance (WVTR) of less than $10^{-5}$ $g/m^2 \cdot d$.

* * * * *